(12) United States Patent
Tsukahara

(10) Patent No.: US 8,403,512 B2
(45) Date of Patent: Mar. 26, 2013

(54) ILLUMINATION APPARATUS AND DISPLAY APPARATUS

(75) Inventor: Tsubasa Tsukahara, Tokyo (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 12/734,900

(22) PCT Filed: Nov. 25, 2008

(86) PCT No.: PCT/JP2008/071358
§ 371 (c)(1),
(2), (4) Date: Jun. 1, 2010

(87) PCT Pub. No.: WO2009/072418
PCT Pub. Date: Jun. 11, 2009

(65) Prior Publication Data
US 2010/0238648 A1 Sep. 23, 2010

(30) Foreign Application Priority Data
Dec. 7, 2007 (JP) ................................ 2007-317568

(51) Int. Cl.
*G09F 13/04* (2006.01)
(52) U.S. Cl. ....... 362/97.3; 362/231; 362/244; 362/246; 362/84; 313/502; 257/98
(58) Field of Classification Search ........ 362/97.1–97.3, 362/249.02, 231, 84, 235, 244, 246
See application file for complete search history.

(56) References Cited

U.S. PATENT DOCUMENTS 5,771,039 A * 6/1998 Ditzik .......................... 345/178
8,240,875 B2 * 8/2012 Roberts et al. ........... 362/217.05

FOREIGN PATENT DOCUMENTS

| JP | 2003-222861 | 8/2003 |
| JP | 2005-108635 | 4/2005 |
| JP | 2005-115372 | 4/2005 |
| JP | 2006-344409 | 12/2006 |

OTHER PUBLICATIONS

Japanese Office Action issued Jun. 12, 2012 in connection with Japanese Application No. 2007-317568.

* cited by examiner

*Primary Examiner* — Ali Alavi
(74) *Attorney, Agent, or Firm* — Wolf, Greenfield & Sacks, P.C.

(57) ABSTRACT

[Object] To provide an illumination apparatus capable of reducing a view angle dependency of a chromaticity distribution in a light-emitting surface of a phosphor layer.
[Solving Means] A light beam control device (11) that controls emitted light from light-emitting diodes (10) so that a view angle dependency of a chromaticity distribution in a light-emitting surface (22a) of a phosphor layer (22) is suppressed is interposed between the light-emitting diodes (10) and the phosphor layer (22). The light beam control device (11) causes the emitted light from the light-emitting diodes (10) to be bent in a vertical direction or an approximately-vertical direction with respect to the light-emitting surface (22a) of the phosphor layer (22) and thus causes the light to enter the phosphor layer (22). As a result, light that obliquely enters a surface of the phosphor layer (22) is lessened, and the view angle dependency of the chromaticity distribution in the light-emitting surface (22a) of the phosphor layer (22) is reduced.

18 Claims, 25 Drawing Sheets (A)

(B)

(A)

(B)

(A)

(B)

ILLUMINATION APPARATUS AND DISPLAY APPARATUS

TECHNICAL FIELD

The present invention relates to an illumination apparatus used in a display apparatus such as a liquid crystal display, and a display apparatus that uses the illumination apparatus.

The present application contains subject matter related to that disclosed in Japanese Priority Patent Application JP 2007-317568 filed in the Japan Patent Office on Dec. 7, 2007, the entire content of which is hereby incorporated by reference.

BACKGROUND ART

Liquid crystal displays are used as flat-screen display apparatuses. In the liquid crystal displays, a backlight that irradiates an entire surface of a liquid crystal panel from the back is used, and the liquid crystal displays can be roughly classified into a direct type and an edge-light type depending on structures of the backlights. Since light enters from a side surface of a light guide plate to be emitted uniformly from an upper surface of the light guide plate to the liquid crystal panel in the edge-light type, there has been a drawback that it becomes more difficult to illuminate the entire panel uniformly with high luminance as the display becomes larger. Therefore, a backlight of a current large-size display is provided with a plurality of fluorescent lamps to obtain desired characteristics (see, for example, Patent Document 1).

Incidentally, in recent years, aiming at additionally reducing a thickness and weight, prolonging a lifetime, and reducing an environmental load of backlights of large-size displays and also at improving moving-image characteristics by flash control, using a light-emitting diode as a light source is attracting attention. In a case of emitting white light to illuminate a liquid crystal panel in such a backlight that uses a light-emitting diode, it is general to realize white light by combining light of light-emitting diodes of three colors of R, G, and B by lighting them up at the same time, or covering a circumference of a blue-color light-emitting diode chip of a blue-color light-emitting diode that is used as the light-emitting device with a phosphor-containing resin to thus convert a color of light into white.

Patent Document 1: Japanese Patent Application Laid-open No. 2005-108635

DISCLOSURE OF THE INVENTION

Problems to be Solved by the Invention

However, when using the light-emitting diodes of three colors of R, G, and B, there has been a drawback that since it is difficult to match characteristics of the light-emitting diodes of the respective colors due to differences in luminance efficiencies and differences in temporal changes in the light-emitting diodes, color changes are large and a color mixture space is required, with the result that the backlight becomes thick. In other words, this technique has been inappropriate for reducing a thickness and weight.

Moreover, when realizing white light by covering the circumference of the blue-color light-emitting diode chip with the phosphor-containing resin to thus convert the color of light into white, there has been a problem that since a phosphor on the chip circumference is apt to be exposed to high-intensity light and high temperature, the phosphor is apt to deteriorate. In other words, this technique has been inappropriate for prolonging a lifetime.

Furthermore, since the light-emitting diodes are each a point light source, it has been difficult to mix light emitted from those point light sources for obtaining white light with no chromaticity unevenness and luminance unevenness within a light-emitting surface. Specifically, there has been a problem that it is difficult to realize a uniform white-color planar light source since luminance and a chromaticity distribution of light emitted from a phosphor layer are varied due to random incident angles of emitted light from the light-emitting diodes with respect to the phosphor layer.

The present invention has been made in view of the circumstances as described above, and an object of the present invention is to provide an illumination apparatus capable of reducing a view angle dependency of a chromaticity distribution in a light-emitting surface of a phosphor layer, and a display apparatus that uses the illumination apparatus.

Means for Solving the Problems

To attain the object above, according to the present invention, there is provided an illumination apparatus, characterized by including: a substrate; a plurality of light-emitting devices mounted on the substrate; a phosphor layer to obtain white light based on light from the plurality of light-emitting devices; and a light beam control portion to control the light from each of the plurality of light-emitting devices so that a view angle dependency of a chromaticity distribution of the phosphor layer is suppressed.

Since the light beam control portion is provided in the present invention, light that obliquely enters a surface of the phosphor layer out of emitted light from the light-emitting devices is lessened, and a view angle dependency of a chromaticity distribution in a light-emitting surface of the phosphor layer can be reduced.

The illumination apparatus is characterized in that the light beam control portion is an optical device that controls the light from the plurality of light-emitting devices to enter a light-emitting surface of the phosphor layer in a vertical direction or an approximately-vertical direction.

The illumination apparatus is characterized in that each of the plurality of light-emitting devices is a blue-color light-emitting diode, and the phosphor layer includes a phosphor that emits green light by being excited by blue light as the excitation light and a phosphor that emits red light by being excited by the excitation light. Accordingly, an illumination apparatus that emits white light can be obtained, and a view angle dependency of a chromaticity distribution in the light-emitting surface of the phosphor layer can be reduced in the illumination apparatus that emits white light.

The illumination apparatus is characterized in that each of the plurality of light-emitting devices is a blue-color light-emitting diode, and the phosphor layer includes a phosphor that emits yellow light by being excited by blue light as the excitation light. Accordingly, an illumination apparatus that emits white light can be obtained, and a view angle dependency of a chromaticity distribution in the light-emitting surface of the phosphor layer can be reduced in the illumination apparatus that emits white light.

Further, the illumination apparatus is characterized in that each of the plurality of light-emitting devices is a purple-color (near-ultraviolet) light-emitting diode, and the phosphor layer includes a phosphor that emits red light by being excited by purple (near-ultraviolet) light as the excitation light, a phosphor that emits green light by being excited by the excitation light, and a phosphor that emits blue light by being excited by the excitation light. Accordingly, an illumination apparatus that emits white light can be obtained, and a view angle dependency of a chromaticity distribution in the light-emitting surface of the phosphor layer can be reduced in the illumination apparatus that emits white light.

The illumination apparatus is characterized in that the plurality of light-emitting devices are arranged two-dimensionally on the substrate. Accordingly, a direct-type backlight can be obtained, and a view angle dependency of a chromaticity distribution in the light-emitting surface of the phosphor layer can be reduced in the direct-type backlight.

Furthermore, the illumination apparatus of the present invention is characterized by further including a light guide plate, and in that the plurality of light-emitting devices are arranged such that emitted light enters from one end surface of the light guide plate, and the phosphor layer is disposed to face a light-emitting surface of the light guide plate. Accordingly, a view angle dependency of a chromaticity distribution in the light-emitting surface of the phosphor layer can be reduced in an edge-light-type backlight.

Moreover, the edge-light-type backlight is characterized in that the light beam control portion is interposed between the light-emitting surface of the light guide plate and the phosphor layer. Accordingly, light that obliquely enters the surface of the phosphor layer is lessened, and an effect of reducing a view angle dependency of a chromaticity distribution in the light-emitting surface of the phosphor layer can be obtained.

Further, in the edge-light-type backlight, the light beam control portion may be provided in the light guide plate.

According to another aspect of the present invention, there is provided a display apparatus characterized by including: a display panel; and an illumination apparatus provided adjacent to the display panel, the illumination apparatus including a substrate, a plurality of light-emitting devices mounted on the substrate, a phosphor layer to obtain white light based on light from the plurality of light-emitting devices, and a light beam control portion to control the light from each of the plurality of light-emitting devices so that a view angle dependency of a chromaticity distribution of the phosphor layer is suppressed.

Since an illumination apparatus including a light beam control portion is used in the present invention, a display apparatus that has a reduced view angle dependency of a chromaticity distribution in a display panel surface and an excellent display quality can be obtained.

Effect of the Invention

As described above, according to the present invention, it is possible to obtain an illumination apparatus with a reduced view angle dependency of a chromaticity distribution in a light-emitting surface of a phosphor layer and also obtain a display apparatus having an excellent display quality by using the illumination apparatus in the display apparatus.

BEST MODES FOR CARRYING OUT THE INVENTION

Hereinafter, an embodiment of the present invention will be described with reference to the drawings. In the embodiment below, a display apparatus including an illumination apparatus of the present invention is applied to a liquid crystal television.

It should be noted that an applicable range of the display apparatus of the present invention is not limited to the liquid crystal television, and the display apparatus is widely applicable to, for example, a personal computer and a PDA (Personal Digital Assistant) as long as it includes the illumination apparatus.

FIG. 24 is a schematic perspective view of a liquid crystal television 100 as the display apparatus of the present invention, and FIG. 25 is an exploded perspective view schematically showing a portion held by a casing 300 of the liquid crystal television 100. As shown in the figures, the liquid crystal television 100 includes a liquid crystal panel 200 as a display panel, an illumination apparatus 1 (101, 201, 301, and 401), a drive circuit 420 that drives the liquid crystal panel 200, the casing 300 that holds the liquid crystal panel, the illumination apparatus 1, and the drive circuit 420, and a stand 400 that holds the casing 300. The illumination apparatus 1 illuminates an image display area of the liquid crystal panel 200 from the back and emits white light.

First Embodiment

Hereinafter, an illumination apparatus as an embodiment of the present invention will be described.

FIG. 1(A) is a schematic plan view of a light-emitting device substrate 14 partially constituting the illumination apparatus 1, and FIG. 1(B) is a schematic cross-sectional diagram of the illumination apparatus 1. FIG. 2 is a partially-enlarged cross-sectional diagram of the illumination apparatus 1.

As shown in FIG. 1, the illumination apparatus 1 includes the light-emitting device substrate 14 whose planar shape is a rectangle, reflective plates 13, a phosphor sheet 20 whose planar shape is a rectangle, and a light beam control device 11 as a light beam control portion that is interposed between the light-emitting device substrate 14 and the phosphor sheet 20. The light-emitting device substrate 14 and the phosphor sheet 20 are apart by about 1 to 30 mm, and a gap 16 therebetween is supported by a plurality of support columns 12 and the reflective plates 13. The reflective plates 13 are provided so as to surround the space defined by the light-emitting device substrate 14 and the phosphor sheet 20. By providing the reflective plates 13, excitation light from light-emitting diodes 10 as light-emitting devices is reflected by the reflective plates 13 even when guided to an end portion of the illumination apparatus 1 so that the light can be reused, thus leading to a favorable light efficiency. A side of the illumination apparatus 1 on which the phosphor sheet 20 is provided becomes a light-emitting surface, and the illumination apparatus 1 is disposed such that the liquid crystal panel 200 to be a display screen is disposed on the light-emitting surface side of the illumination apparatus 1 in the state of the liquid crystal television 100 shown in FIG. 24. The illumination apparatus 1 of this embodiment is used in a large-size liquid crystal television of, for example, 46 inches, and has a dimension of 1020 mm×570 mm.

The light-emitting device substrate 14 includes a substrate 15 constituted of a glass cloth substrate formed of a resin such as phenol, epoxy, polyimide, polyester, bismaleimide triazine, allylic polyphenylene oxide, and fluorine, and a total of 3200 (80×40) light-emitting diodes 10 arranged on the substrate 15 at regular intervals of, for example, 12-mm pitches. The light-emitting diodes 10 are arranged two-dimensionally in correspondence with an entire surface of the phosphor sheet 20. In this embodiment, an InGaN-based blue-color light-emitting diode is used as each of the light-emitting diodes 10.

As shown in FIG. 2, the phosphor sheet 20 includes a transparent substrate 23 formed of, for example, PET (polyethylene terephthalate), and a phosphor layer 22 provided on one surface of the transparent substrate 23.

The phosphor layer 22 includes two types of phosphors including a green-color phosphor that emits green light having a green-color wavelength as a second wavelength by being excited by blue light having a blue-color wavelength as a first wavelength, that is emitted from the light-emitting diodes 10 (blue-color light-emitting diodes), and a red-color phosphor that emits red light having a red-color wavelength as the second wavelength by being excited by the blue light. With this structure, green light and red light color-converted by the phosphor layer 22 are mixed with blue light as the excitation light emitted from the light-emitting diodes 10 (blue-color light-emitting diodes), with the result that white light is generated and emitted.

It should be noted that the method of obtaining white light is not limited thereto. For example, the phosphor layer 22 may include a yellow-color phosphor that emits yellow light having a yellow-color wavelength as the second wavelength by being excited by the blue light having the blue-color wavelength as the first wavelength, that is emitted from the light-emitting diodes 10 (blue-color light-emitting diodes). With this structure, yellow light color-converted by the phosphor layer 22 is mixed with blue light, with the result that white light is obtained.

Also, although the blue-color light-emitting diodes have been used as the light-emitting devices in this embodiment, the light-emitting diodes are not limited thereto. For example, it is also possible to use purple-color (near-ultraviolet) light-emitting diodes instead of the blue-color light-emitting diodes and use a phosphor layer including a red-color phosphor that emits red light having a red-color wavelength as a second wavelength by being excited by purple (near-violet) light having a purple-color (near-violet) wavelength as a first wavelength, that is emitted from the purple-color (near-violet) light-emitting diodes, a green-color phosphor that emits green light having a green-color wavelength as the second wavelength by being excited by the purple (near-violet) light, and a blue-color phosphor that emits blue light having a blue-color wavelength as the second wavelength by being excited by the purple (near-violet) light. With this structure, red light, green light, and blue light color-converted by the phosphor layer are mixed with the purple (near-violet) light, with the result that white light is obtained.

Moreover, although white light is obtained in this embodiment, types of light-emitting devices and phosphors can be selected as appropriate for obtaining light of a desired color as light to be emitted from the illumination apparatus 1.

For the phosphor layer 22, a phosphor layer obtained by dispersing, for example, $SrGa_2S_4:Eu^{2+}$ as the green-color phosphor and $(Ca, Sr, Ba)S:Eu^{2+}$ as the red-color phosphor in a binder formed of a resin such as ethyl cellulose and polyvinyl alcohol was used. The description before ":" in the descriptions on the phosphor materials represents a matrix, and the description after that represents an activator.

The light beam control device 11 is an optical device that controls emitted light from the light-emitting diodes 10 so that a view angle dependency of a chromaticity distribution in the light-emitting surface 22a of the phosphor layer 22 is suppressed, more specifically, an optical device that controls emitted light from the light-emitting diodes 10 to enter the light-emitting surface 22a of the phosphor layer 22 in a vertical direction or an approximately-vertical direction. As an optical device capable of performing such control, there are, for example, a Fresnel lens, a prism, and an optical device with a controlled refractive-index distribution. As the optical device with a controlled refractive-index distribution, there are an optical device that uses a subwavelength pillar structure, an optical device that uses a refractive optical device, and the like. It should be noted that as long as the same control can be performed, those not exemplified may of course be adopted as the light beam control device 11.

FIG. 2 shows a state of control of emitted light from the light-emitting diodes 10 by the light beam control device 11. Light emitted from the light-emitting diodes 10 is bent in the vertical or approximately-vertical direction with respect to the light-emitting surface 22a of the phosphor layer 22 when passing through the light beam control portion 10 and thus enters the phosphor layer 22. Accordingly, since light that obliquely enters the surface of the phosphor layer 22 is lessened, the view angle dependency of the chromaticity distribution in the light-emitting surface 22a of the phosphor layer 22 is reduced.

A result of controlling emitted light from the light-emitting diodes 10 by the light beam control device 11 and measuring a chromaticity from angular positions of 45 degrees (a) and 70 degrees (b) with respect to the light-emitting surface 22a of the phosphor layer 22 as shown in FIG. 3(A) is shown in FIG. 4(A). In this case, a value of u' and a value of v' from the position of 45 degrees (a) were "0.164" and "0.377", respectively, and a value of u' and a value of v' from the position of 70 degrees (b) were "0.158" and "0.422", respectively. A result of calculating a color difference that is a distance between two chromaticity points was "0.046". On the other hand, a result of measuring, in a case where the light beam control device 11 is not used, a chromaticity from angular positions of 45 degrees (c) and 70 degrees (d) with respect to the light-emitting surface 22a of the phosphor layer 22 as shown in FIG. 3(B) is shown in FIG. 4(B). In this case, a value of u' and a value of v' from the position of 45 degrees (c) were "0.164" and "0.377", respectively, and a value of u' and a value of v' from the position of 70 degrees (d) were "0.156" and "0.433", respectively. A color difference between two chromaticity points was "0.054". As described above, it was confirmed that the view angle dependency of the chromaticity distribution in the light-emitting surface 22a of the phosphor layer 22 can be suppressed by the light beam control device 11.

Next, examples of the present invention will be described.

Example 1

FIG. 5 is a cross-sectional diagram showing a structure of the illumination apparatus 1 that uses a Fresnel lens 31 as the light beam control device 11, and FIG. 6 is a side view showing a positional relationship between the Fresnel lens 31 and the light-emitting diode 10 and a plan view of the Fresnel lens 31. The Fresnel lens 31 is obtained by annularly cutting out a convex surface of a plano-convex lens to obtain serrate rings, and continuously and concentrically arranging the rings. Each of the Fresnel lenses 31 is positioned such that an optical center thereof coincides with an optical axis of the corresponding one of the light-emitting diodes 10. A shape of the concentric rings of the Fresnel lens 31 is designed such that emitted light from the light-emitting diodes 10 is bent in the vertical or approximately-vertical direction with respect to the light-emitting surface 22a of the phosphor layer 22 to thus enter the phosphor layer 22. With this structure, light that obliquely enters the surface of the phosphor layer 22 of the phosphor sheet 20 is lessened, and the view angle dependency of the chromaticity distribution in the light-emitting surface 22a of the phosphor layer 22 is reduced.

It should be noted that the Fresnel lenses 31 are incorporated into the illumination apparatus 1 as a lens sheet 32 in which a plurality of lens portions 31a each having a Fresnel structure are continuously and integrally formed in longitudinal and lateral directions.

Example 2

FIG. 8 is a cross-sectional diagram showing a structure of the illumination apparatus 1 that uses prisms 33 and 34 as the light beam control device 11, and FIG. 9 is a side view showing a positional relationship between the prisms 33 and 34 and the light-emitting diode 10 and plan views of the prisms 33 and 34. The prisms 33 and 34 are planar prisms having periodical curved surfaces in which peaks and valleys are continuously formed in a uniaxial direction. The prisms 33 and 34 overlap each other in a direction in which axes thereof become orthogonal. The periodical curved surfaces of the prisms 33 and 34 are designed such that emitted light from the light-emitting diodes 10 is bent in the vertical or approximately-vertical direction with respect to the light-emitting surface 22a of the phosphor layer 22 to thus enter the phosphor layer 22. With this structure, light that obliquely enters the surface of the phosphor layer 22 is lessened, and the view angle dependency of the chromaticity distribution in the light-emitting surface 22a of the phosphor layer 22 is reduced.

It should be noted that in the illumination apparatus 1 of Example 2, the light beam control device 11 (prisms 33 and 34) can be positioned more easily than in Example 1. While positioning of the Fresnel lens 31 in the biaxial directions is required in the illumination apparatus 1 of Example 1 for causing the optical center of the Fresnel lens 31 to coincide with the optical axis of the corresponding one of the light-emitting diodes 10, since the prisms 33 and 34 only need to be positioned individually such that positions thereof in the axial directions coincide with the optical axes of the light-emitting diodes 10 in Example 2, a positioning process is simple.

Two prisms 33 and 34 overlapping each other in the directions in which axes thereof become orthogonal have been used as the light beam control device 11 in Example 2. However, by using one of the two prisms 33 and 34 as the light beam control device 11, an effect of reducing light that obliquely enters the surface of the phosphor layer 22 can be obtained in a uniaxial direction, with the result that the view angle dependency of the chromaticity distribution in the light-emitting surface 22a of the phosphor layer 22 is reduced.

Example 3

FIG. 10 is a cross-sectional diagram showing a structure of the illumination apparatus 1 that uses a refractive-index distribution optical device 35 as the light beam control device 11, and FIG. 11 is a side view showing a positional relationship between the refractive-index distribution optical device 35 and the light-emitting diode 10 and a plan view of the refractive-index distribution optical device 35. A refractive-index distribution of the refractive-index distribution optical device 35 is set so that a refractive index successively increases from the center to an outer side thereof such that emitted light from the light-emitting diodes 10 is bent in the vertical or approximately-vertical direction with respect to the light-emitting surface 22a of the phosphor layer 22 to thus enter the phosphor layer 22. With this structure, since light that obliquely enters the surface of the phosphor layer 22 is lessened, the view angle dependency of the chromaticity distribution in the light-emitting surface 22a of the phosphor layer 22 is reduced.

Modified Example 1 of Example 3

Although FIG. 11 shows a case where the refractive-index distribution optical device 35 having a two-dimensional refractive-index distribution is used, it is also possible to use a refractive-index distribution optical device 36 that has a one-dimensional refractive-index distribution as shown in FIG. 12. In this case, an effect of reducing light that obliquely enters the surface of the phosphor layer 22 can be obtained in the uniaxial direction, and the view angle dependency of the chromaticity distribution in the light-emitting surface 22a of the phosphor layer 22 can thus be reduced. While positioning of the refractive-index distribution optical device 35 in the biaxial directions is required when using the refractive-index distribution optical device 35 that has a two-dimensional refractive-index distribution for causing the center of the refractive-index distribution optical device 35 to coincide with the optical axis of the corresponding one of the light-emitting diodes 10, since the position of the refractive-index distribution optical device 36 in the axial direction only needs to be made to coincide with the optical axes of the light-emitting diodes 10 when using the refractive-index distribution optical device 36 that has a one-dimensional refractive-index distribution, positioning of the light beam control device 11 is simple.

Example 4

FIG. 13 is a cross-sectional diagram showing a structure of the illumination apparatus 1 that uses a subwavelength pillar structure device 37 as the light beam control device 11, and FIG. 14 is a side view showing a positional relationship between the subwavelength pillar structure device 37 and the light-emitting diode 10 and a plan view of the subwavelength pillar structure device 37. A subwavelength pillar structure realizes an arbitrary refractive-index distribution based on a modulation of a width, a position, and the like of a lattice. The refractive-index distribution of the subwavelength pillar structure device 37 is set so that a refractive index successively increases from the center to an outer side thereof such that emitted light from the light-emitting diodes 10 is bent in the vertical or approximately-vertical direction with respect to the light-emitting surface 22a of the phosphor layer 22 to thus enter the phosphor layer 22. With this structure, it is possible to reduce light that obliquely enters the surface of the phosphor layer 22 of the phosphor sheet 20 and also reduce the view angle dependency of the chromaticity distribution in the light-emitting surface 22a of the phosphor layer 22.

Modified Example 1 of Example 4

Although FIG. 13 shows a case where the subwavelength pillar structure device 37 having a two-dimensional refractive-index distribution is used, it is also possible to use a subwavelength pillar structure device 38 that has a one-dimensional refractive-index distribution as shown in FIG. 15. In this case, an effect of reducing light that obliquely enters the surface of the phosphor layer can be obtained in the uniaxial direction, and the view angle dependency of the chromaticity distribution in the light-emitting surface 22a of the phosphor layer 22 can thus be reduced. While positioning of the subwavelength pillar structure device 37 in the biaxial directions is required when using the subwavelength pillar structure device 37 that has a two-dimensional refractive-index distribution for causing the center of the subwavelength pillar structure device 37 to coincide with the optical axis of the corresponding one of the light-emitting diodes 10, since the position of the subwavelength pillar structure device 38 in the axial direction only needs to be made to coincide with the optical axes of the light-emitting diodes 10 when using the subwavelength pillar structure device 38 that has a one-di-

Example 5

FIG. 16 is a cross-sectional diagram showing a structure of the illumination apparatus 1 of Example 5 in which the light beam control device 11 is integrally formed on a light-incident-side surface of the phosphor sheet 20. By integrally forming the light beam control device 11 on the phosphor sheet 20 as shown in FIG. 16, a size of the light-emitting diodes 10 of the illumination apparatus 1 in the optical-axis direction can be reduced, with the result that the illumination apparatus 1 can be made thinner.

Example 6

FIG. 17 is a cross-sectional diagram showing a structure in a case where the present invention is applied to a side-emitting-type backlight. A side-emitting-type backlight 2 includes a light guide plate 41, the light-emitting diode 10 that emits light from one end surface of the light guide plate 41, the phosphor sheet 20 opposed to a light-emitting surface 41a of the light guide plate 41, and the light beam control device 11 interposed between the light-emitting surface 41a of the light guide plate 41 and the phosphor sheet 20. The light guide plate 41 includes a reflective curve 42 on a surface thereof on the other side of the light-emitting surface 41a opposed to the phosphor sheet 20. As the light beam control device 11, a planar prism, a subwavelength pillar structure device, or the like can be used. The phosphor sheet 20 includes a transparent substrate formed of, for example, PET (polyethylene terephthalate) and a phosphor layer provided on one surface of the transparent substrate.

Emitted light from the light-emitting diodes 10 enters one end surface of the light guide plate 41. Light that has entered the light guide plate 41 proceeds while repeating a total reflection inside the light guide plate 41, and components that have become smaller than a total reflection angle by the reflective curve 42 are emitted from the light-emitting surface 41a of the light guide plate 41 opposed to the phosphor sheet 20. The light beam control device 11 causes at least partial components of the light emitted from the light-emitting surface 41a of the light guide plate 41 as described above to enter the phosphor layer of the phosphor sheet 20 by bending them in the vertical or approximately-vertical direction with respect to the light-emitting surface 22a of the phosphor layer of the phosphor sheet 20. Accordingly, light that obliquely enters the surface of the phosphor layer of the phosphor sheet 20 is lessened, and the view angle dependency of the chromaticity distribution in the light-emitting surface 22a of the phosphor layer is reduced.

Modified Example 1 of Example 6

FIG. 18 is a cross-sectional diagram showing a structure of Modified Example 1 in the case where the present invention is applied to the side-emitting-type backlight. Modified Example 1 involves a process 43 that provides, in place of the light beam control device 11 shown in FIG. 17, the same optical effect as the light beam control device 11 to the light-emitting surface 41a of the light guide plate 41, a process for obtaining, for example, a prism structure or a dot printing structure, and the like. Also with this structure, light that obliquely enters the surface of the phosphor layer of the phosphor sheet 20 is lessened, and the view angle dependency of the chromaticity distribution in the light-emitting surface 22a of the phosphor layer is reduced. It should be noted that the same process 43 may be applied inside the light guide plate 41 instead of on the surface of the light guide plate 41.

Modified Example 2 of Example 6

Moreover, as shown in FIG. 19, also by applying the same process 43 on the surface on the other side of the reflective curve 42 instead of the light-emitting surface 41a of the light guide plate 41, the effect of reducing light that obliquely enters the surface of the phosphor layer 22 of the phosphor sheet 20 can be obtained.

Example 7

FIGS. 20 to 23 are diagrams each showing an arrangement of the light beam control device 11 and the phosphor sheet 20 for enabling the effect of the light beam control device 11 to be exerted in the illumination apparatus to which a reflective polarizing film 51, a lens film 52, a diffuser film 53, and a diffuser plate 54 are added. Here, the diffuser plate 54 and the diffuser film 53 diffuse emitted light from the light-emitting diodes 10 to an extent that the shapes of the light sources cannot be seen. The lens film 52 is an optical film in which minute lenses are arranged on one surface and used for enhancing a directivity of diffused light in a front direction to thus enhance luminance.

In the illumination apparatus shown in FIG. 20, the diffuser plate 54, the diffuser film 53, the lens film 52, the light beam control device 11, the phosphor sheet 20, and the reflective polarizing film 51 are arranged on the light-emitting device substrate 14 in the stated order. In such an arrangement, by designing the light beam control device 11 such that light diffused by the diffuser plate 54 and the diffuser film 53 is bent in the vertical direction with respect to the light-emitting surface of the phosphor layer of the phosphor sheet 20 to enter the phosphor layer, light that obliquely enters the surface of the phosphor layer of the phosphor sheet 20 is lessened, with the result that the view angle dependency of the chromaticity distribution in the light-emitting surface of the phosphor layer is reduced.

Modified Example 1 of Example 7

In the illumination apparatus shown in FIG. 21, the diffuser plate 54, the diffuser film 53, the light beam control device 11, the phosphor sheet 20, the lens film 52, and the reflective polarizing film 51 are arranged on the light-emitting device substrate 14 in the stated order. Even when the lens film 52 is disposed more on the light-emitting diodes 10 side than the light beam control device 11 and the phosphor sheet 20 or on the other side as described above, the effect of the light beam control device 11 can be similarly obtained, and the view angle dependency of the chromaticity distribution in the light-emitting surface of the phosphor layer of the phosphor sheet 20 can be reduced.

Modified Example 2 of Example 7

In the illumination apparatus shown in FIG. 22, the diffuser plate 54, the light beam control device 11, the phosphor sheet 20, the diffuser film 53, the lens film 52, and the reflective polarizing film 51 are arranged on the light-emitting device substrate 14 in the stated order. In such an arrangement, by designing the light beam control device 11 such that light diffused by the diffuser plate 54 is bent in the vertical direction with respect to the light-emitting surface of the phosphor layer of the phosphor sheet 20 to enter the phosphor layer, light that obliquely enters the surface of the phosphor layer of the phosphor sheet 20 is lessened, with the result that the view angle dependency of the chromaticity distribution in the light-emitting surface of the phosphor layer of the phosphor sheet 20 can be reduced.

Modified Example 3 of Example 7

In the illumination apparatus shown in FIG. 23, the light beam control device 11, the phosphor sheet 20, the diffuser plate 54, the diffuser film 53, the lens film 52, and the reflective polarizing film 51 are arranged on the light-emitting device substrate 14 in the stated order. In such an arrangement, by designing the light beam control device 11 such that emitted light from the light-emitting diodes 10 is bent in the vertical direction with respect to the light-emitting surface of the phosphor layer of the phosphor sheet 20 to enter the phosphor layer, light that obliquely enters the surface of the phosphor layer of the phosphor sheet 20 is lessened, with the result that the view angle dependency of the chromaticity distribution in the light-emitting surface of the phosphor layer of the phosphor sheet 20 can be reduced.

The present invention is not limited to the above embodiment, and various updates can of course be added without departing from the gist of the present invention.

DESCRIPTION OF SYMBOLS

Figure 1:
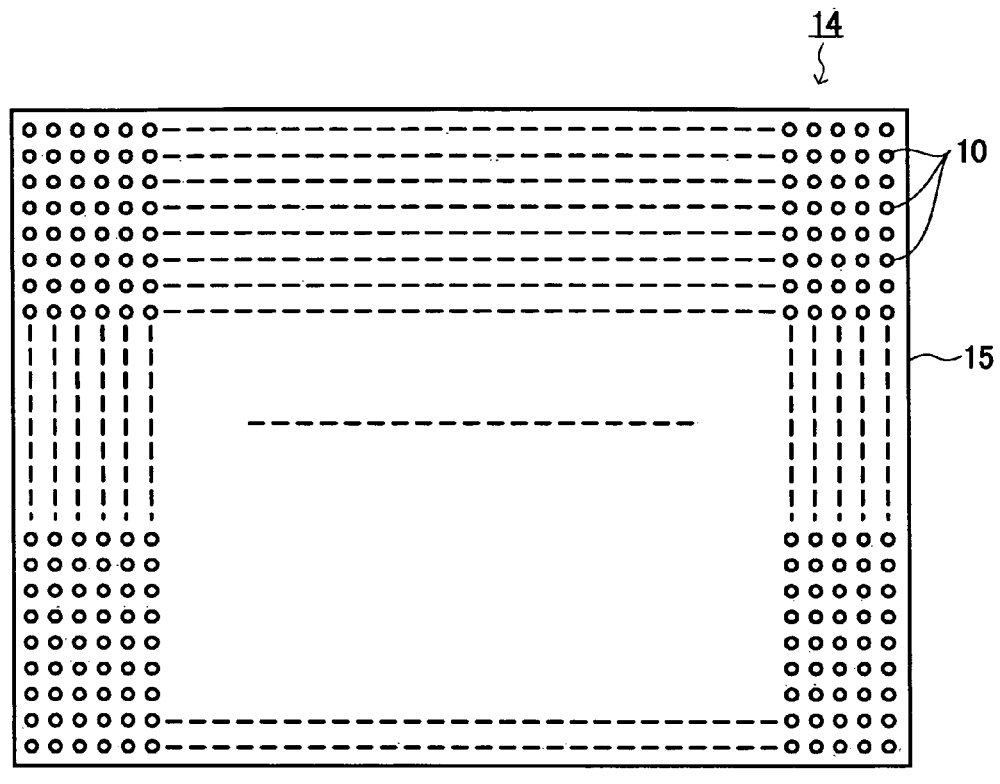
FIG. 1 A schematic plan view of a light-emitting device substrate partially constituting an illumination apparatus according to an embodiment of the present invention and a schematic cross-sectional diagram of the illumination apparatus.
Figure 1:
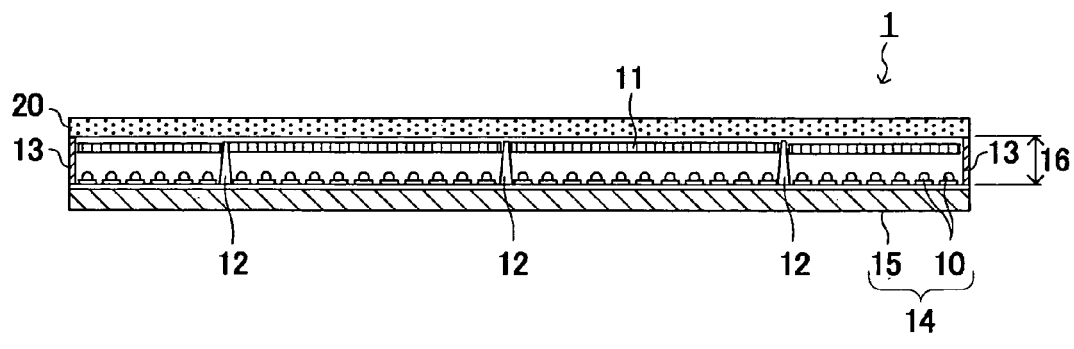
Figure 2:
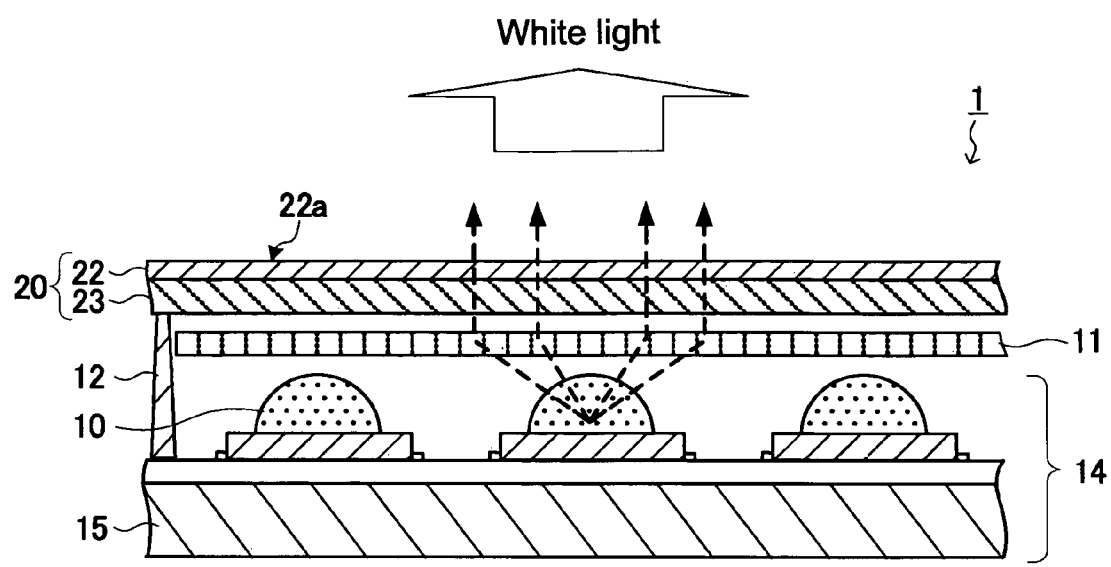
FIG. 2 A partially-enlarged cross-sectional diagram of the illumination apparatus.
Figure 3:
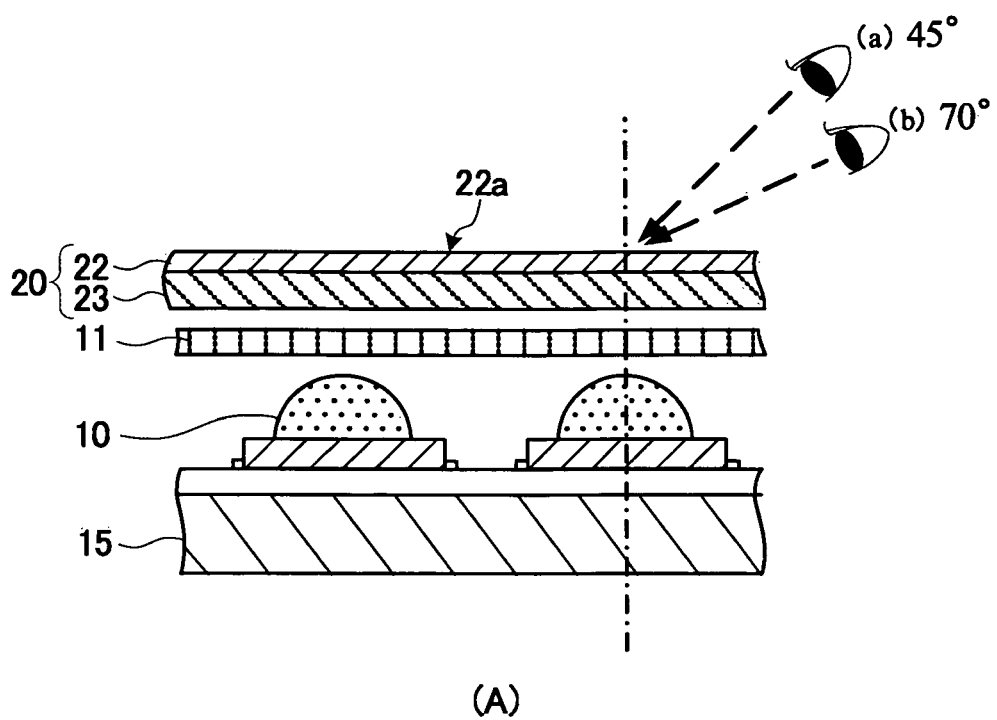
FIG. 3 Diagrams showing conditions for a chromaticity measurement in a light-emitting surface of a phosphor layer.
Figure 3:
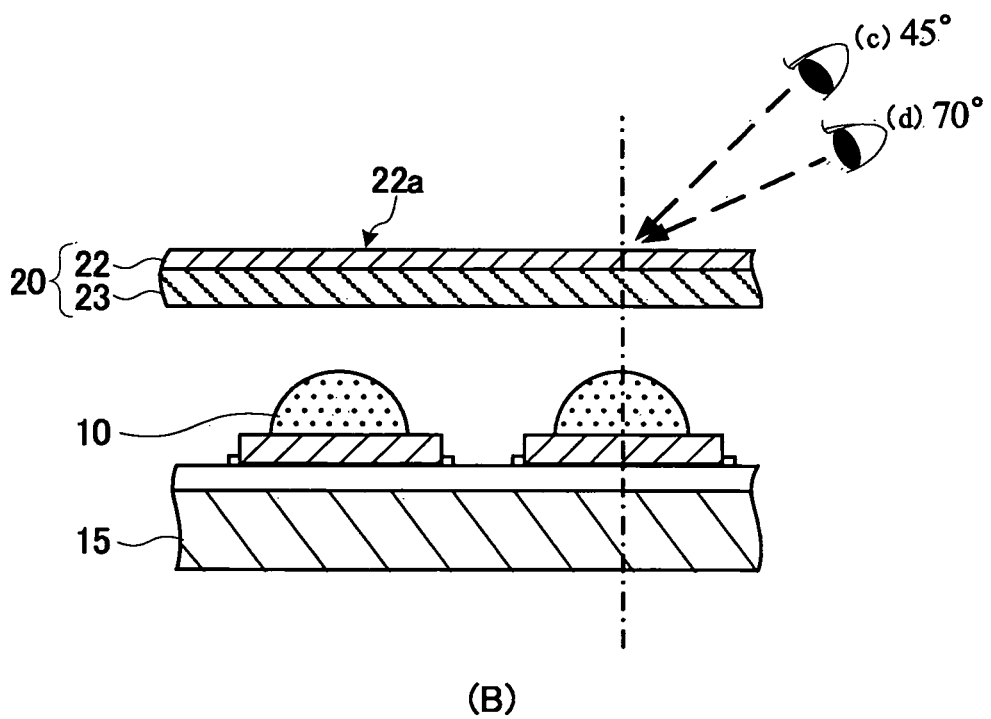
Figure 4:
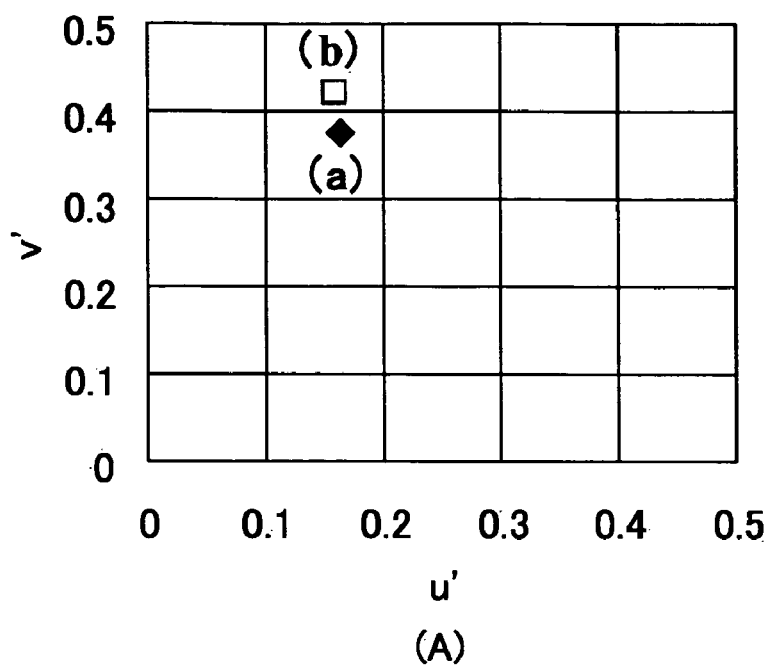
FIG. 4 Graphs showing results of the chromaticity measurement in the light-emitting surface of the phosphor layer.
Figure 4:
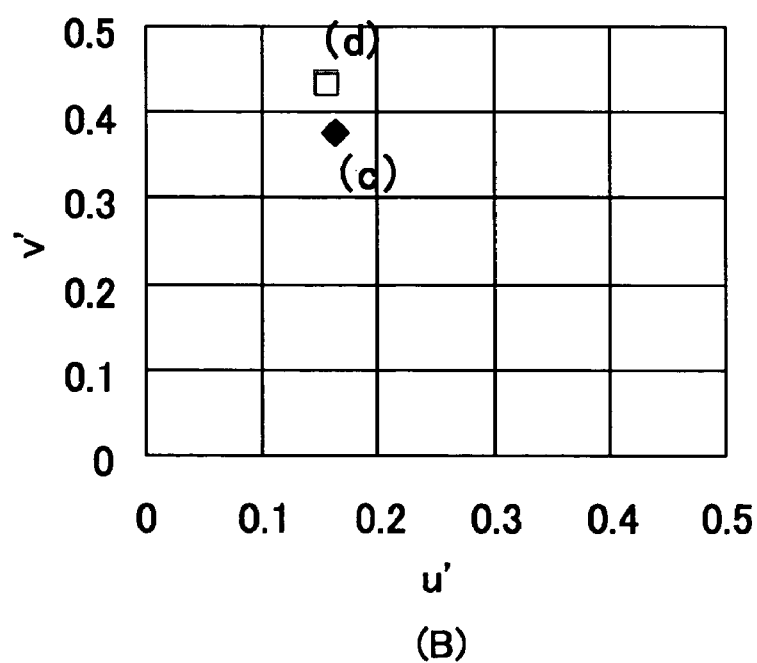
Figure 5:
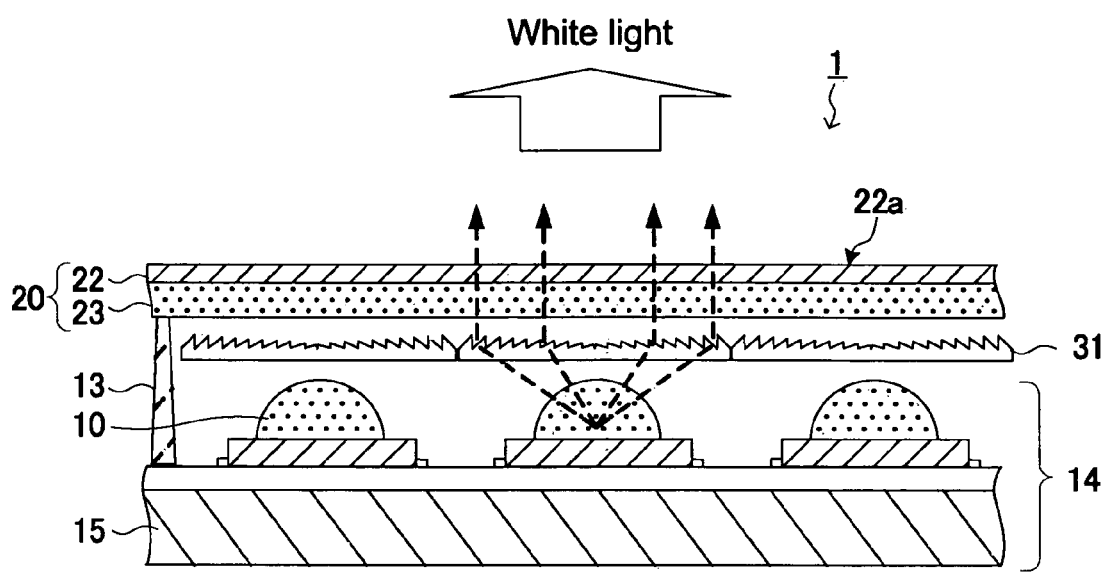
FIG. 5 A cross-sectional diagram showing a structure of an illumination apparatus of Example 1 that uses a Fresnel lens as a light beam control device.
Figure 6:
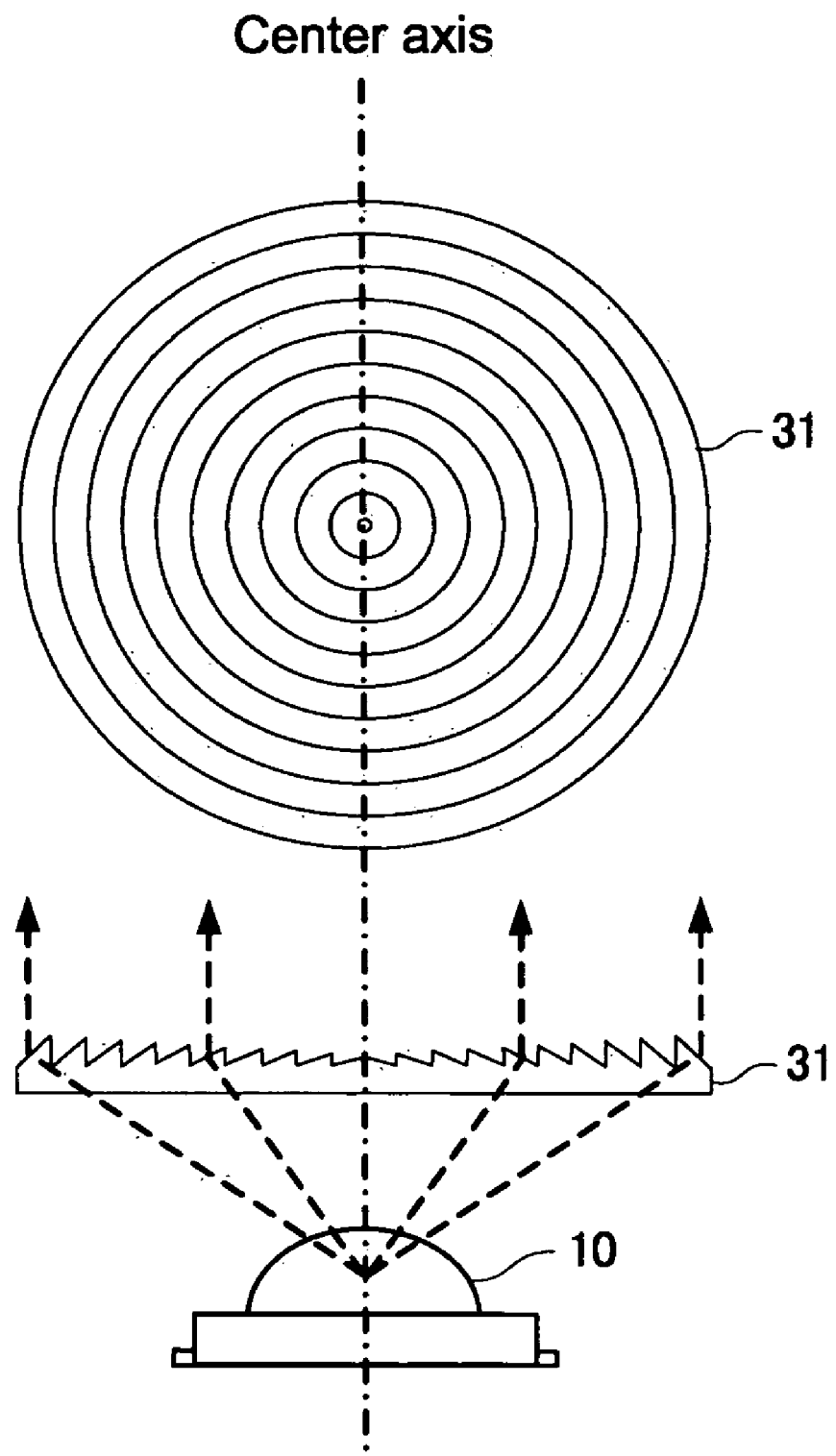
FIG. 6 A side view showing a positional relationship between the Fresnel lens and a light-emitting diode of FIG. 5 and a plan view of the Fresnel lens.
Figure 7:
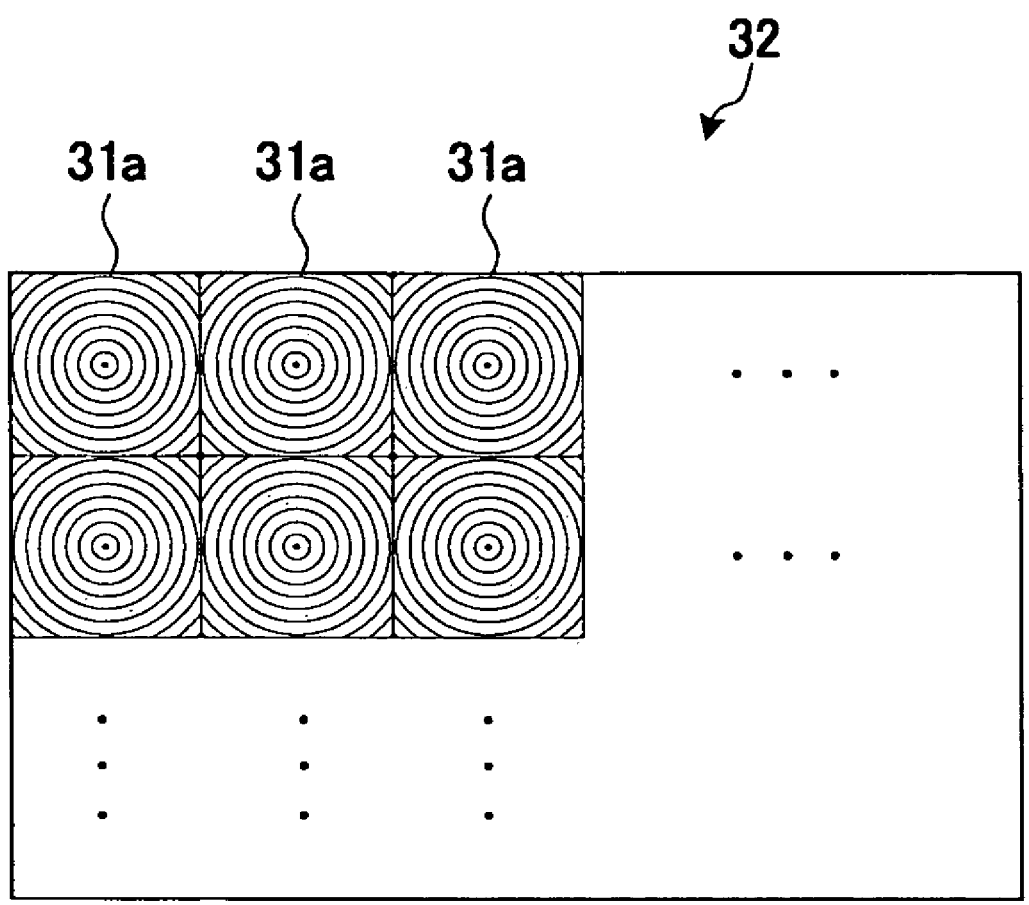
FIG. 7 A plan view showing a sheet of the Fresnel lenses.
Figure 8:
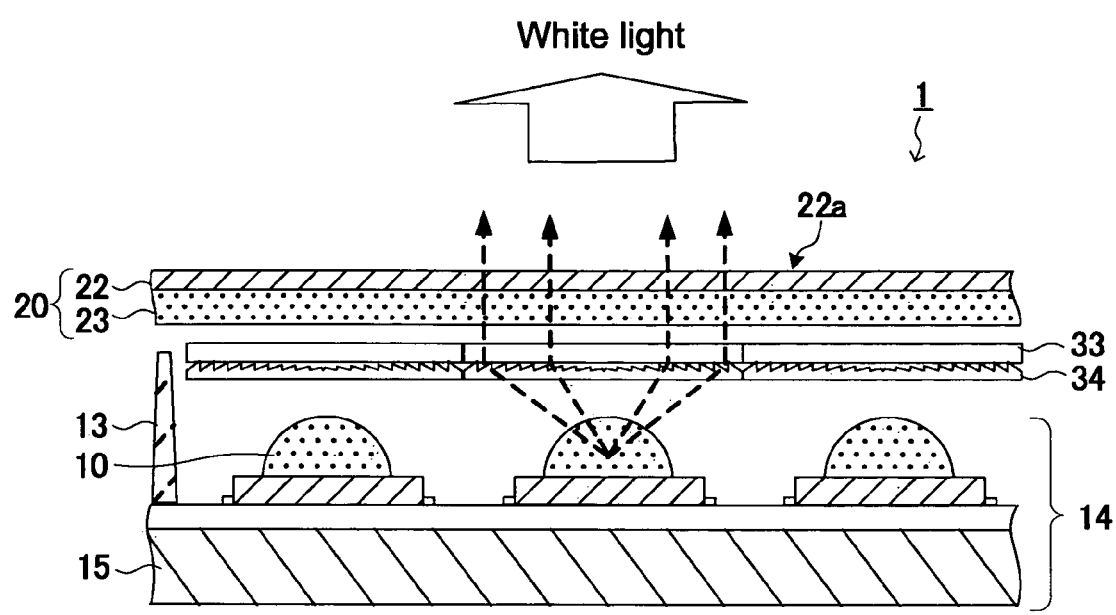
FIG. 8 A cross-sectional diagram showing a structure of an illumination apparatus of Example 2 that uses a prism as the light beam control device.
Figure 9:
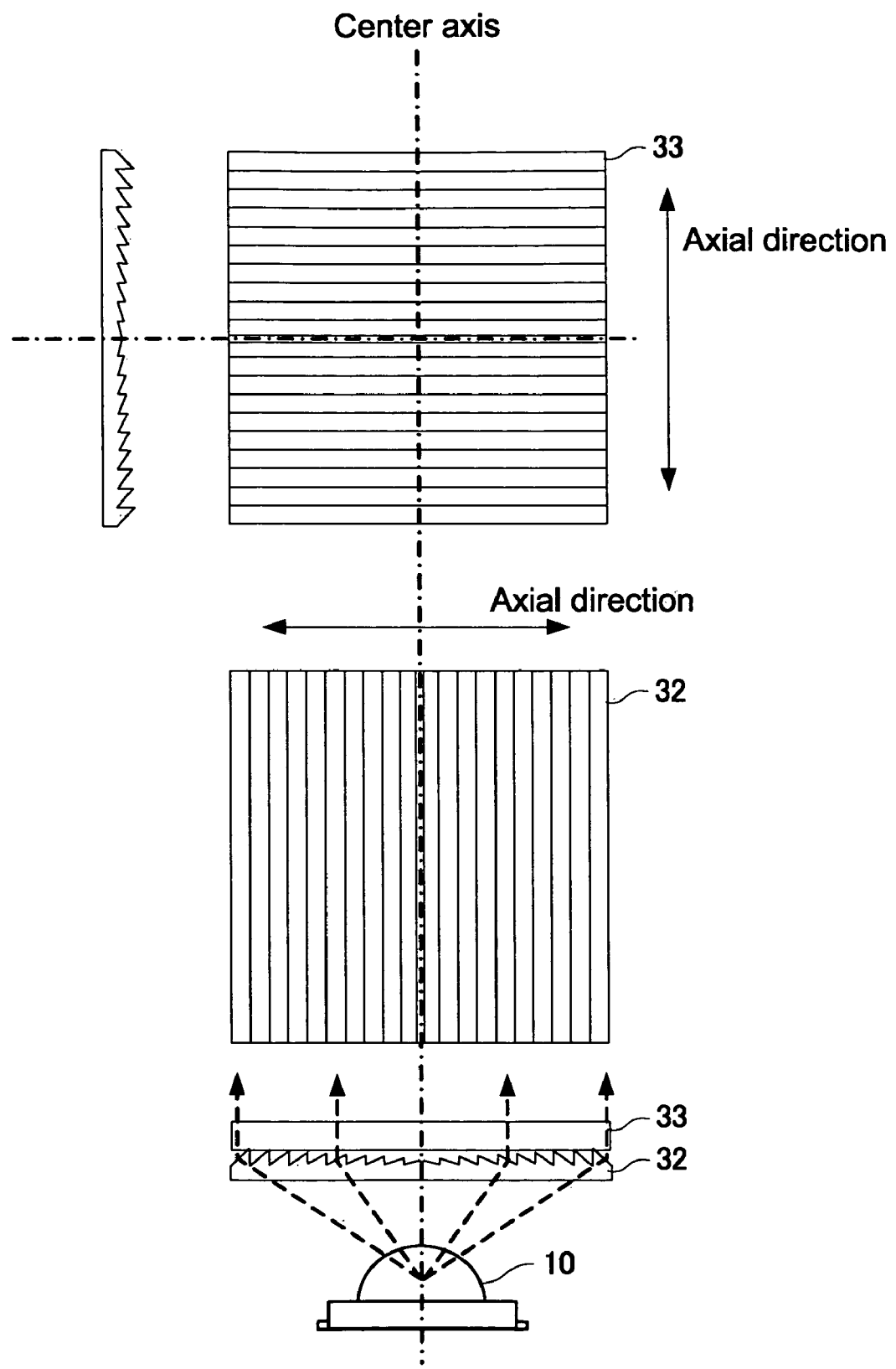
FIG. 9 A side view showing a positional relationship between two prisms and the light-emitting diode of FIG. 8 and plan views of the two prisms.
Figure 10:
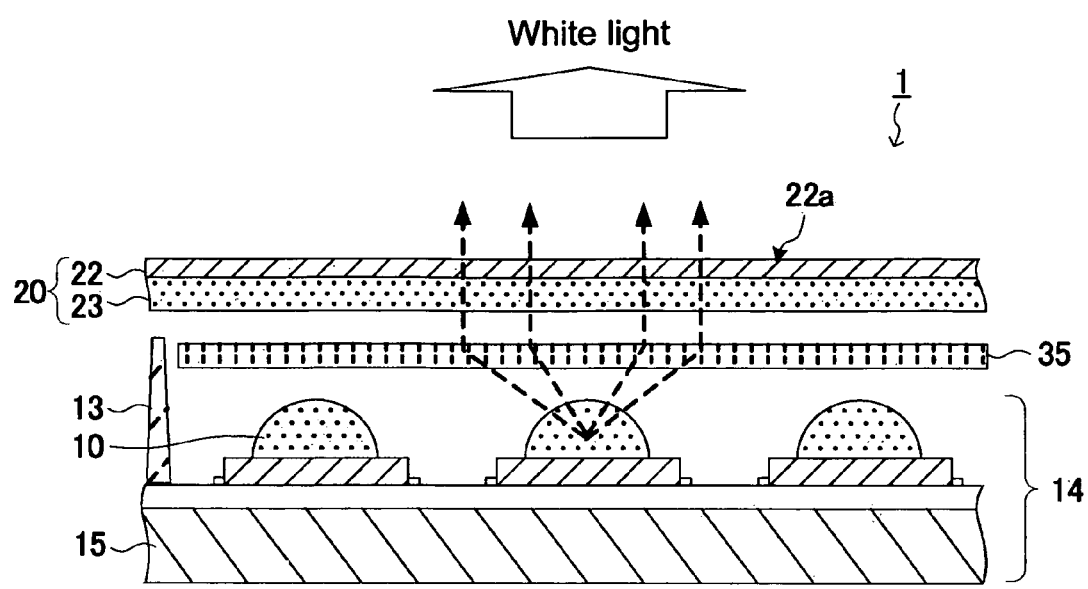
FIG. 10 A cross-sectional diagram showing a structure of an illumination apparatus of Example 3 that uses a refractive-index distribution optical device as the light beam control device.
Figure 11:
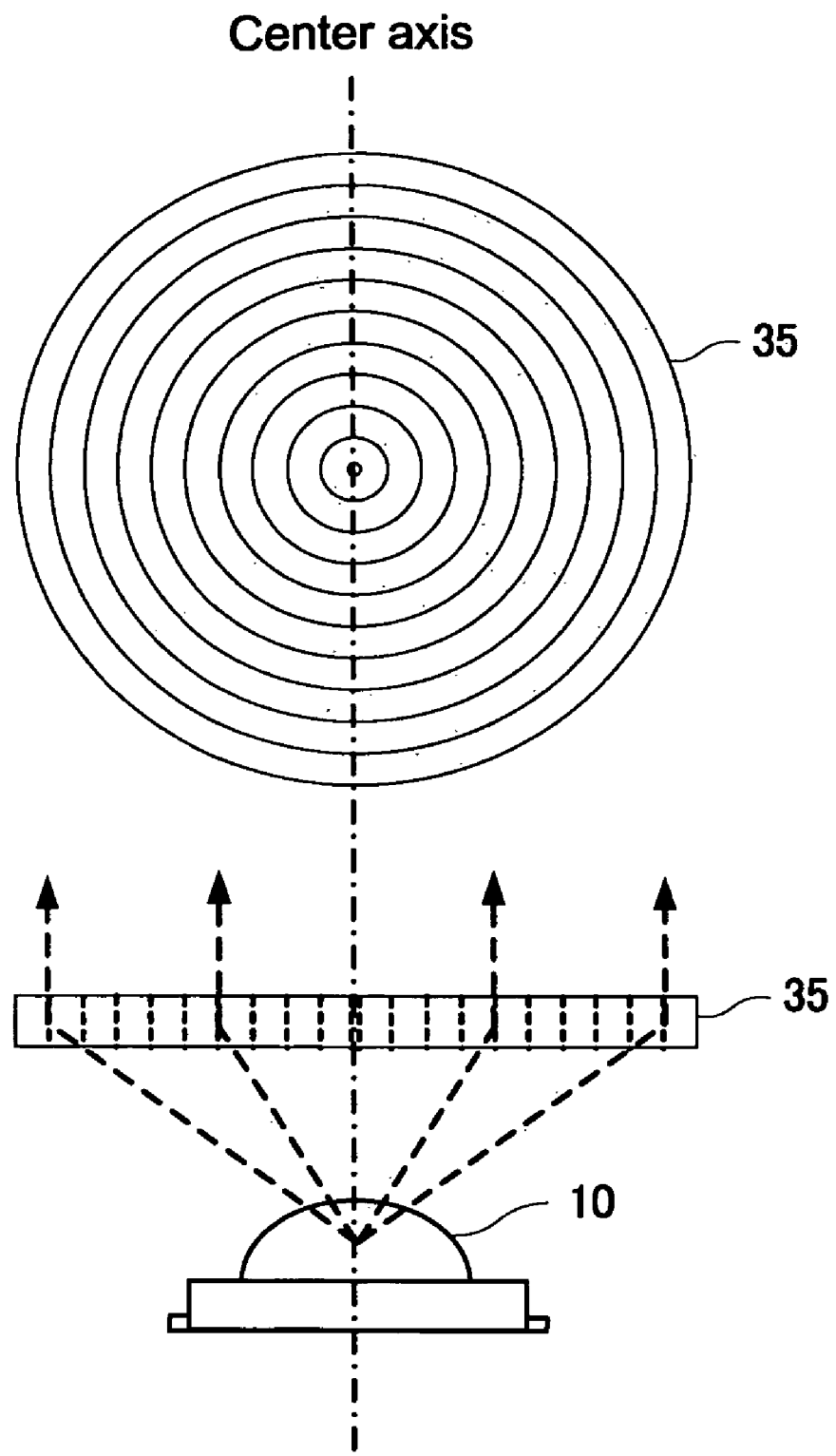
FIG. 11 A side view showing a positional relationship between the refractive-index distribution optical device and the light-emitting diode of FIG. 10 and a plan view of the refractive-index distribution optical device.
Figure 12:
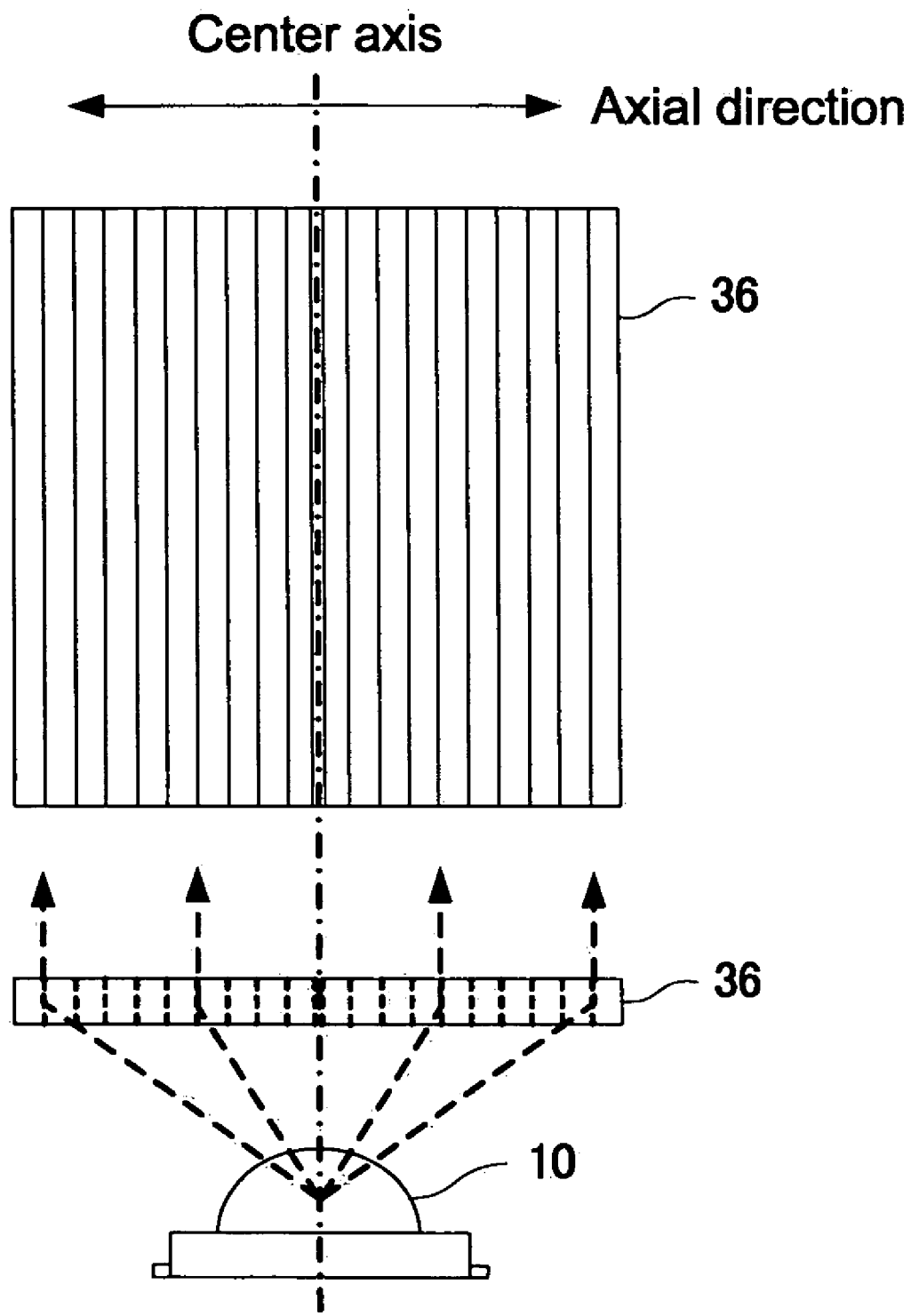
FIG. 12 A diagram showing Modified Example 1 of the illumination apparatus of Example 3.
Figure 13:
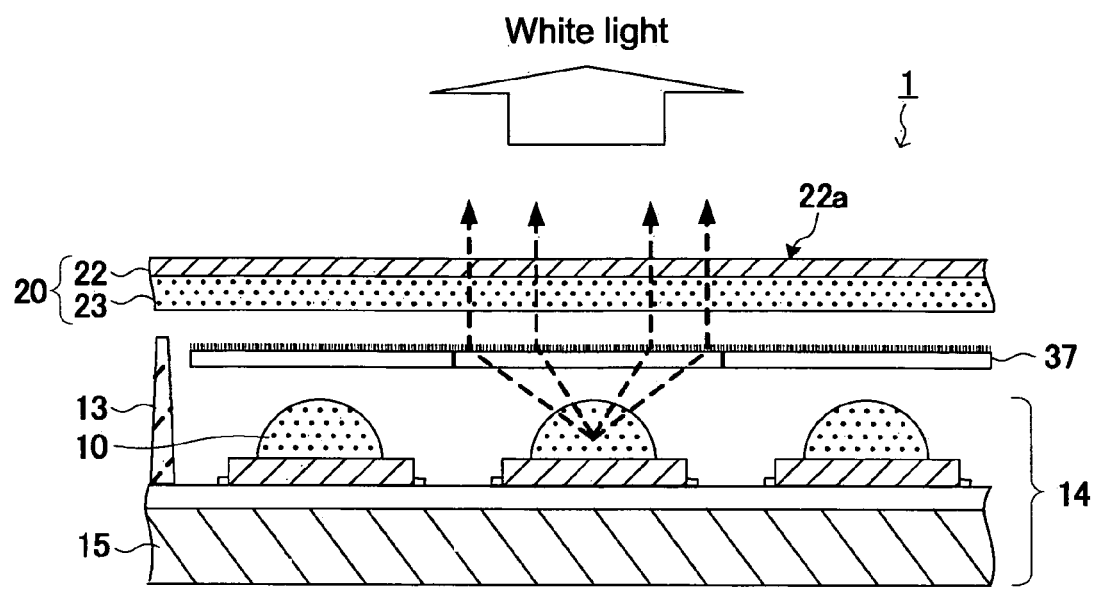
FIG. 13 A cross-sectional diagram showing a structure of an illumination apparatus of Example 4 that uses a subwavelength pillar structure device as the light beam control device.
Figure 14:
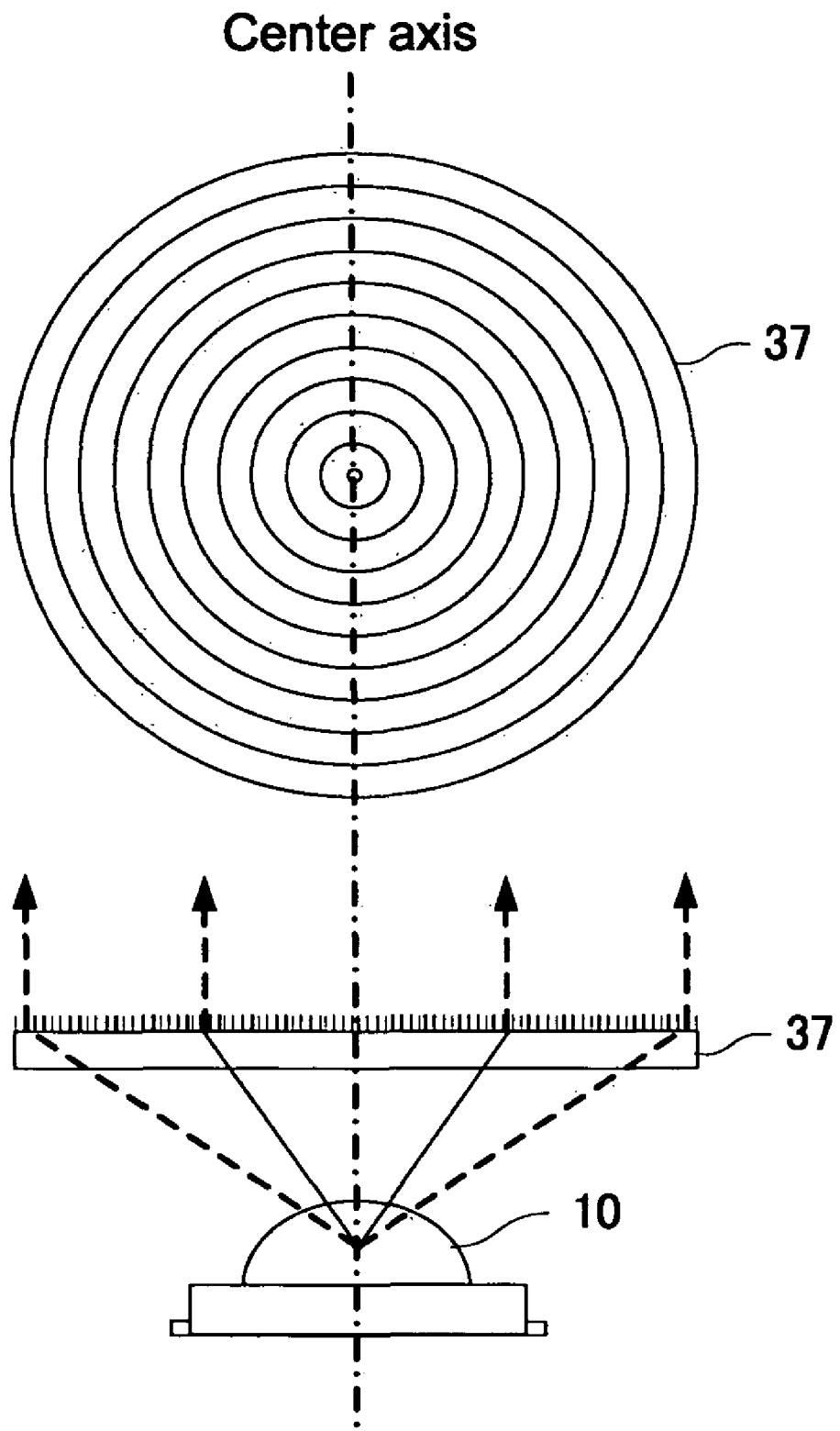
FIG. 14 A side view showing a positional relationship between the subwavelength pillar structure device and the light-emitting diode of FIG. 13 and a plan view of the subwavelength pillar structure device.
Figure 15:
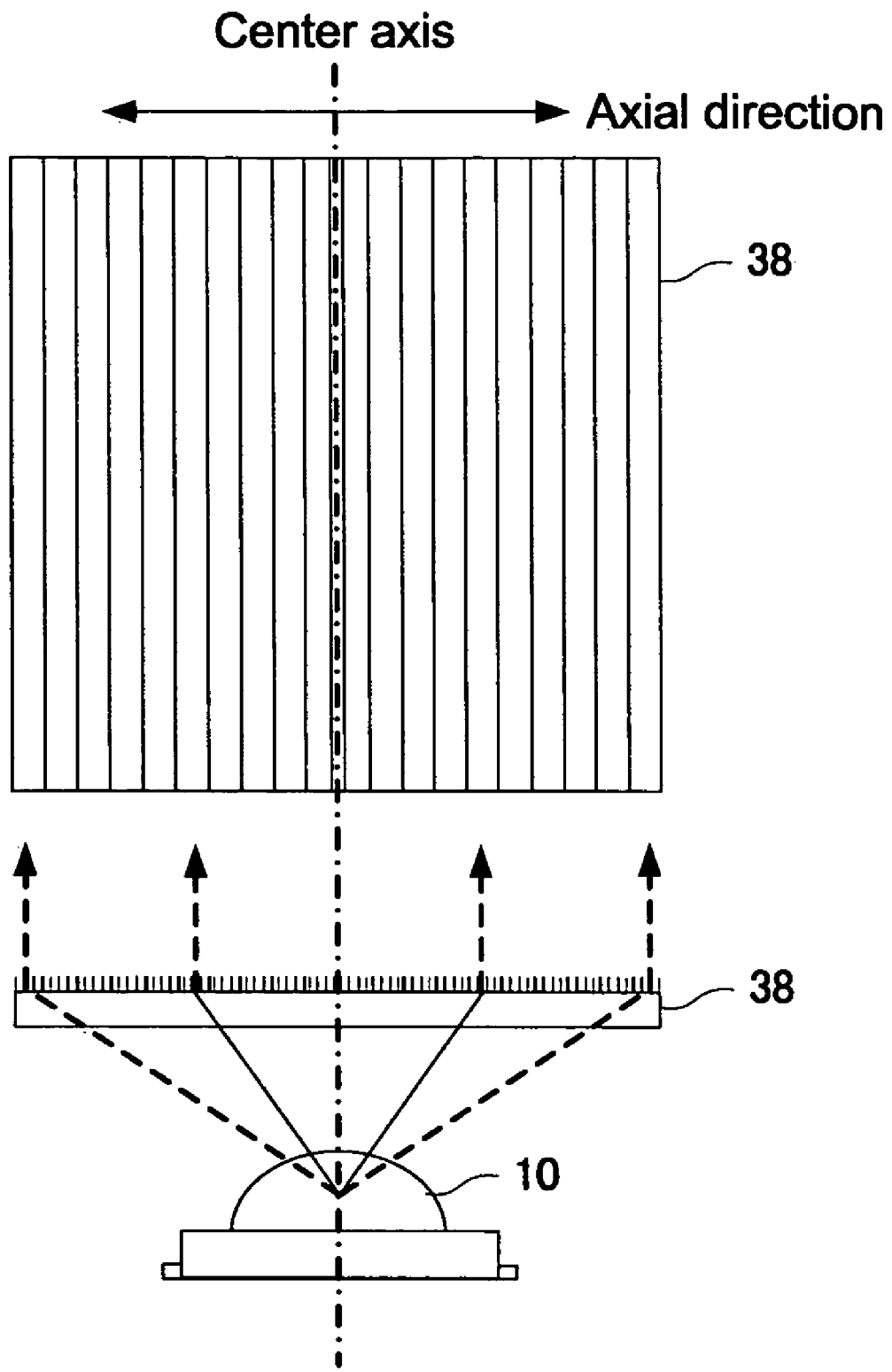
FIG. 15 A diagram showing Modified Example 1 of the illumination apparatus of Example 4.
Figure 16:
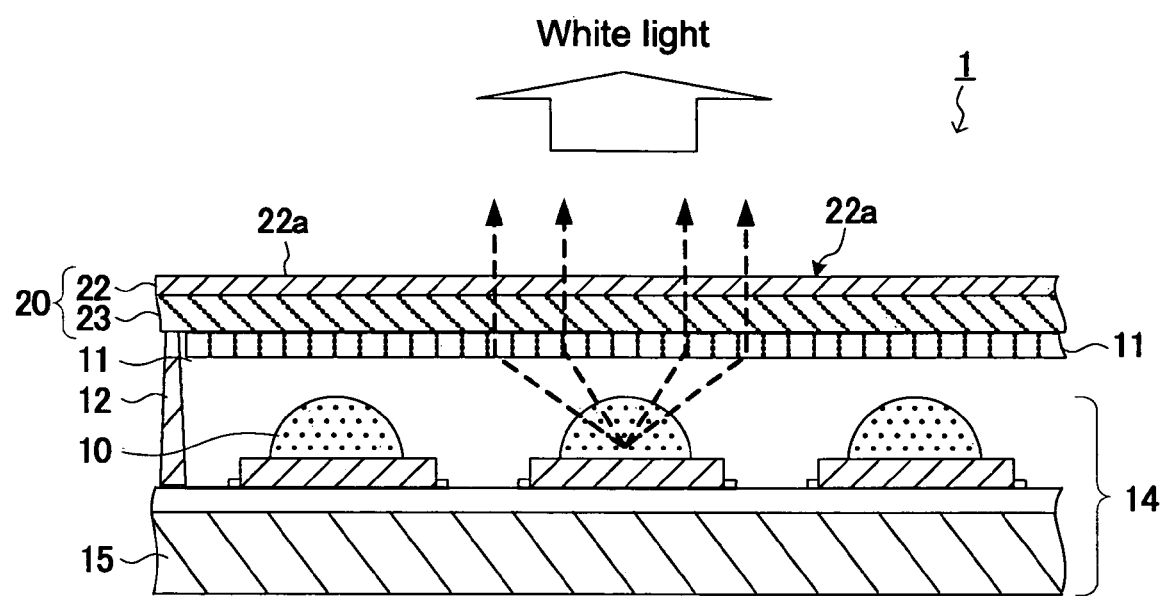
FIG. 16 A cross-sectional diagram showing a structure of an illumination apparatus of Example 5 in which the light beam control device is integrally formed on a light-incident-side surface of a phosphor sheet.
Figure 17:
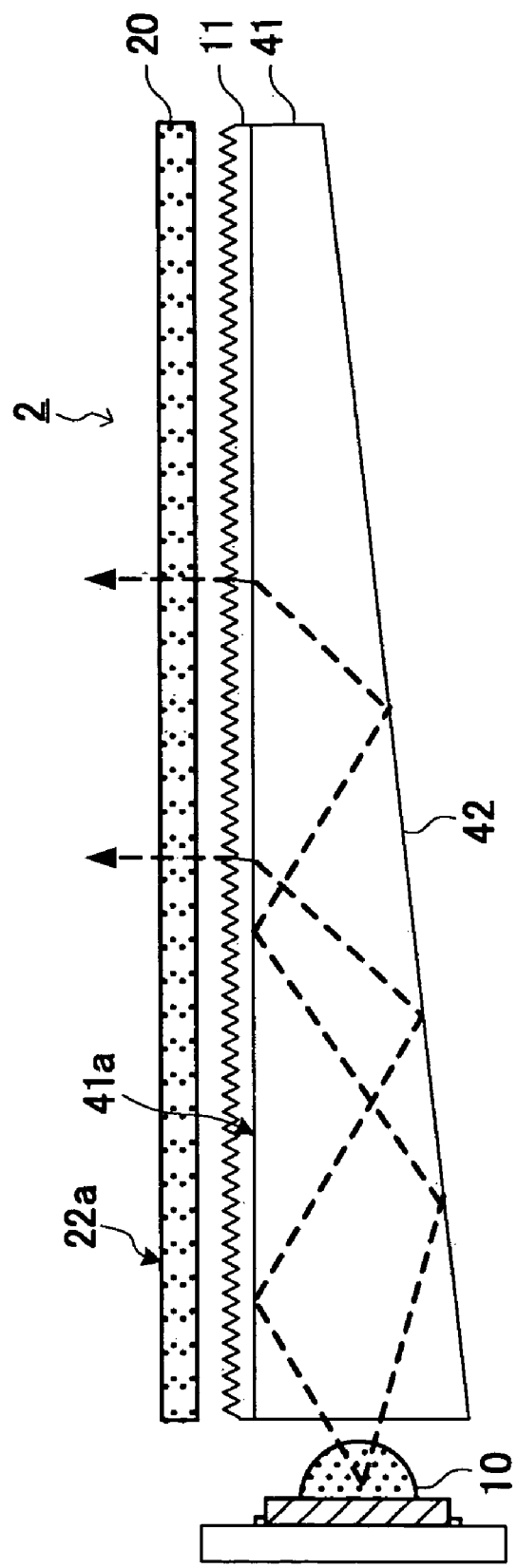
FIG. 17 A cross-sectional diagram showing a structure of Example 6 in a case where the present invention is applied to a side-emitting-type backlight.
Figure 18:
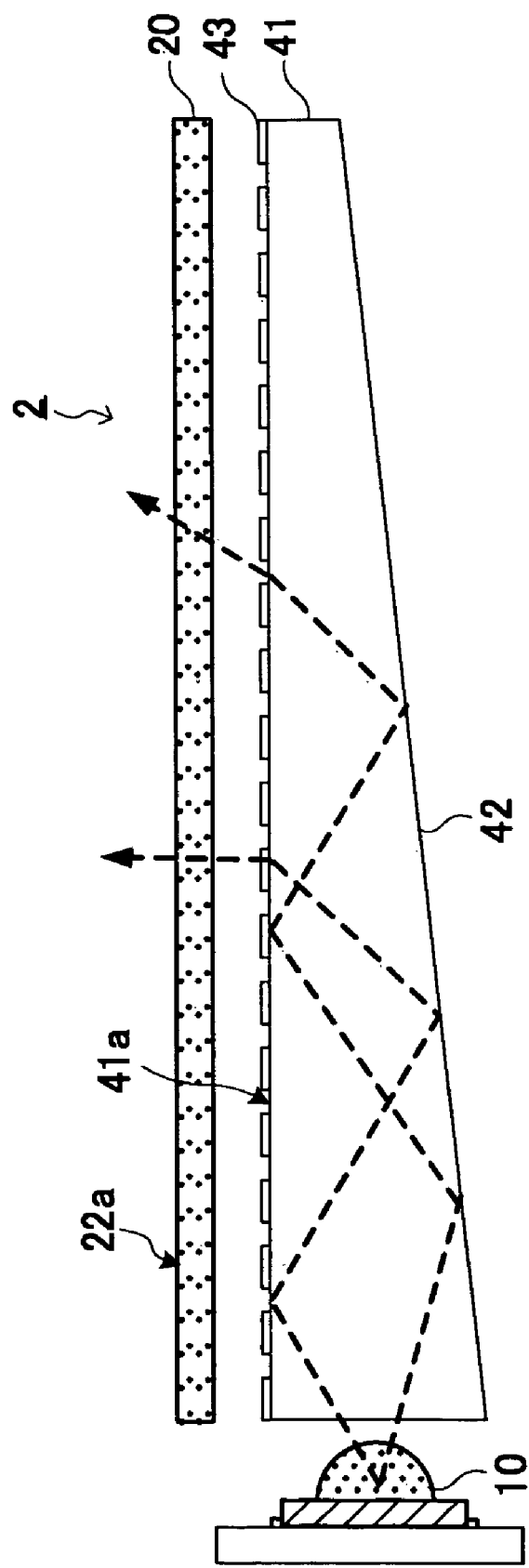
FIG. 18 A cross-sectional diagram showing a structure of Modified Example 1 of Example 6.
Figure 19:
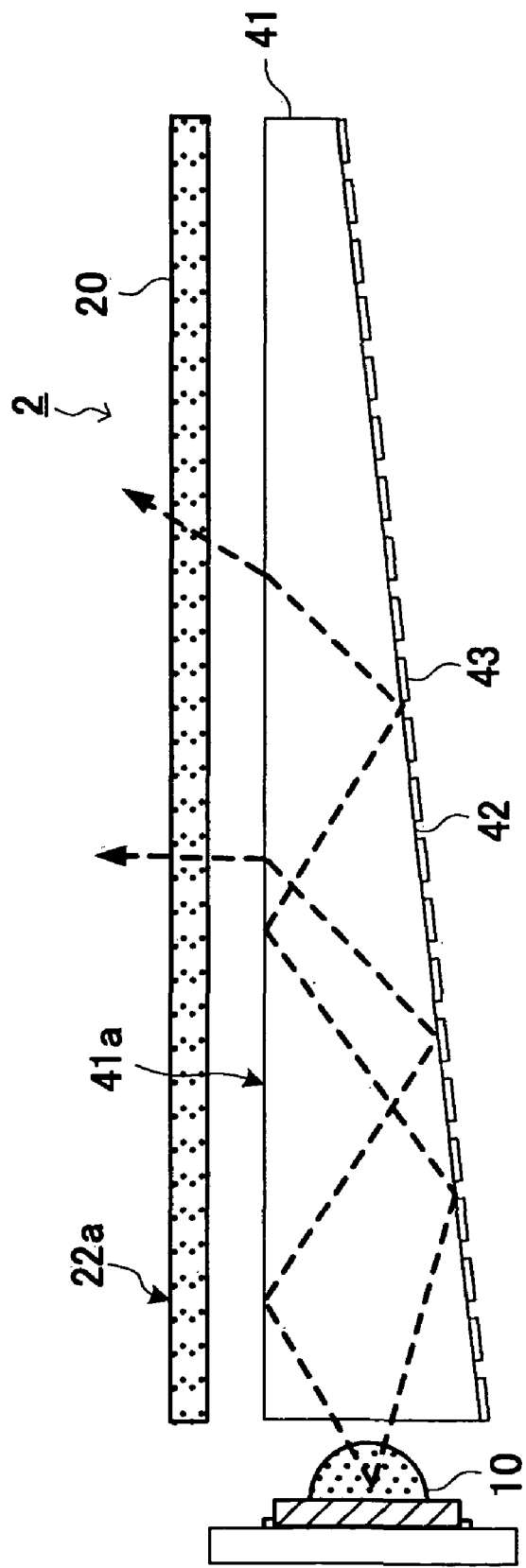
FIG. 19 A cross-sectional diagram showing a structure of Modified Example 2 of Example 6.
Figure 20:
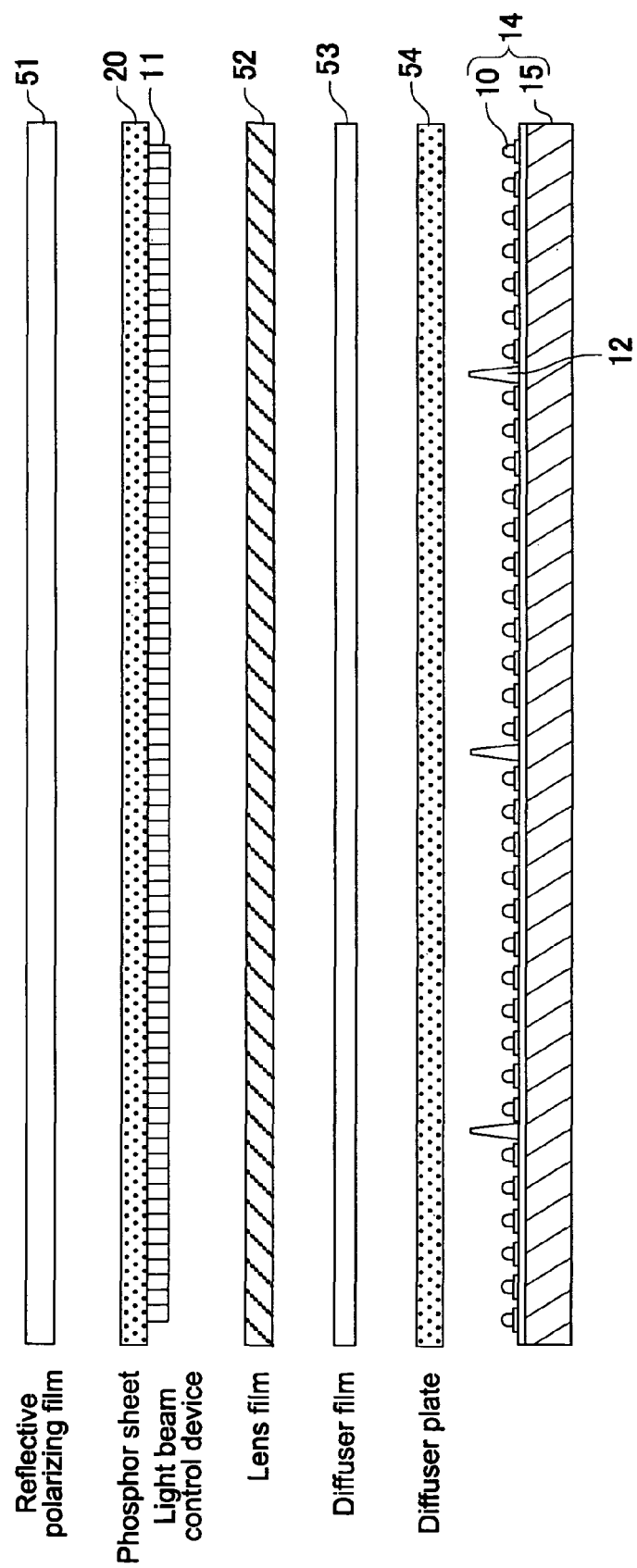
FIG. 20 An exploded cross-sectional diagram showing a structure of an illumination apparatus of Example 7.
Figure 21:
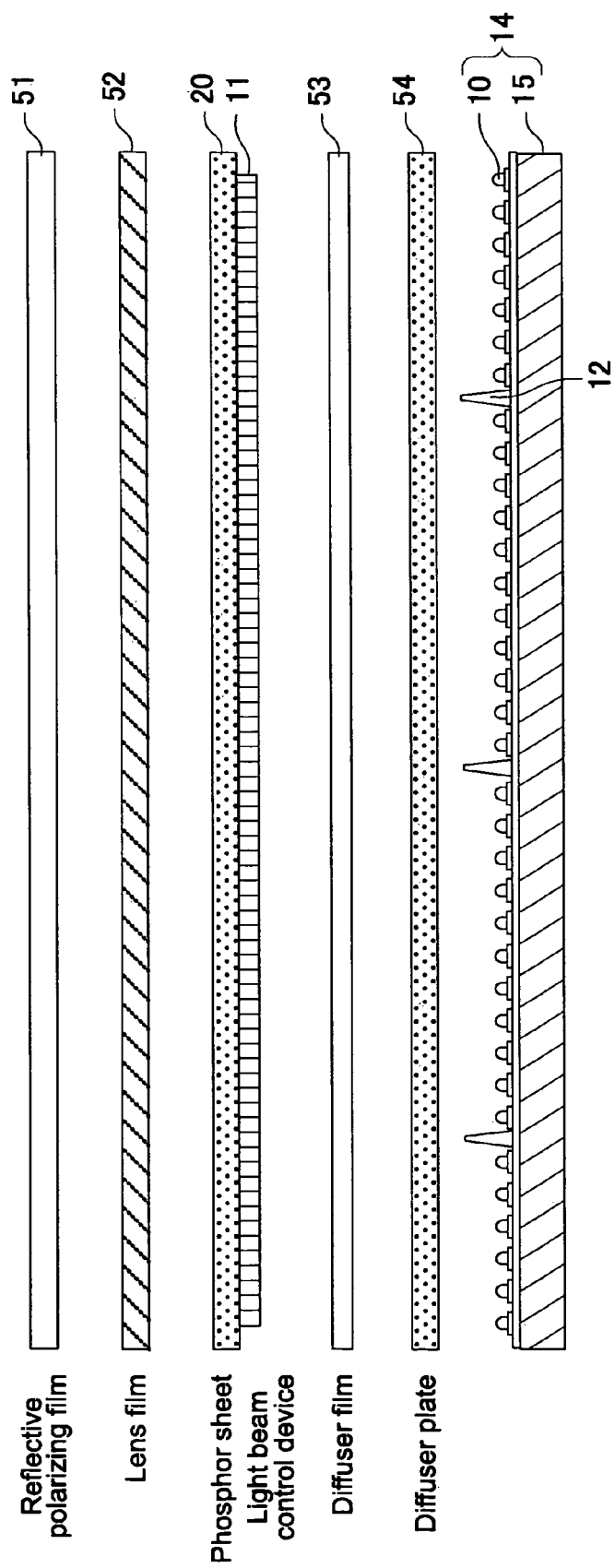
FIG. 21 An exploded cross-sectional diagram showing a structure of Modified Example 1 of Example 7.
Figure 22:
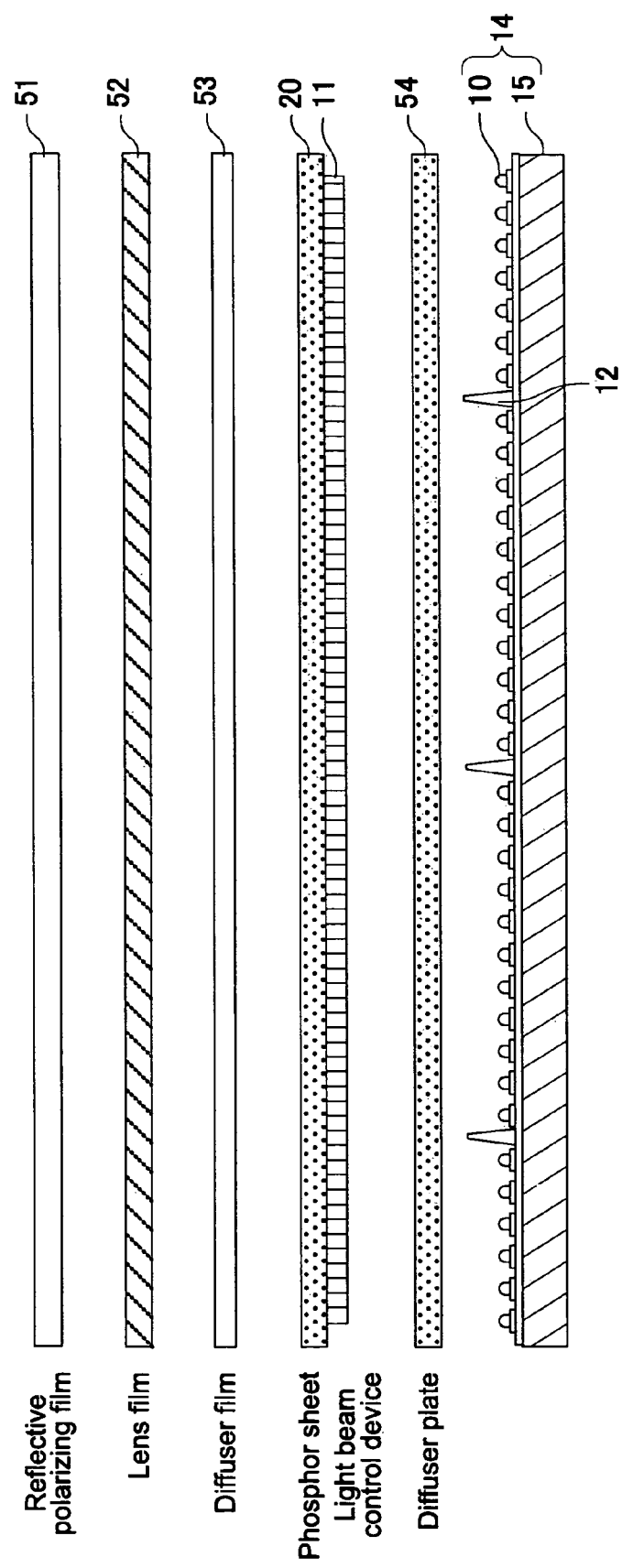
FIG. 22 An exploded cross-sectional diagram showing a structure of Modified Example 2 of Example 7.
Figure 23:
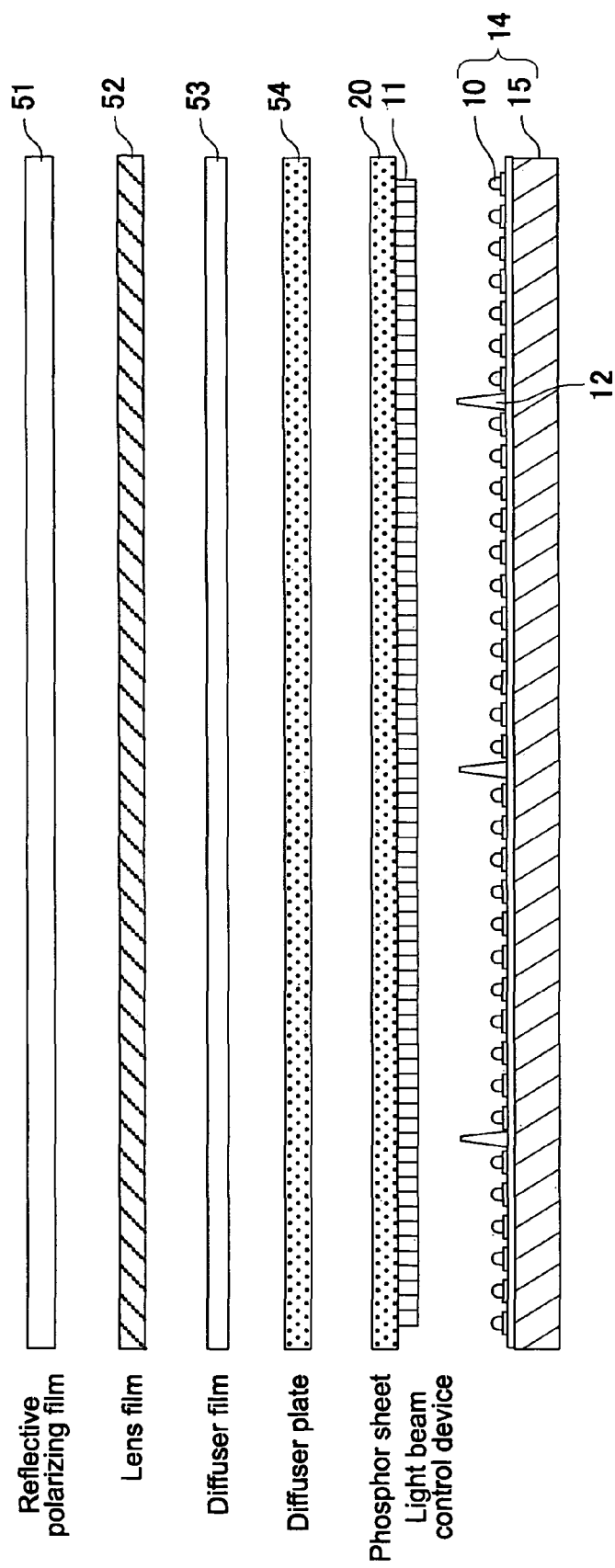
FIG. 23 An exploded cross-sectional diagram showing a structure of Modified Example 3 of Example 7.
Figure 24:
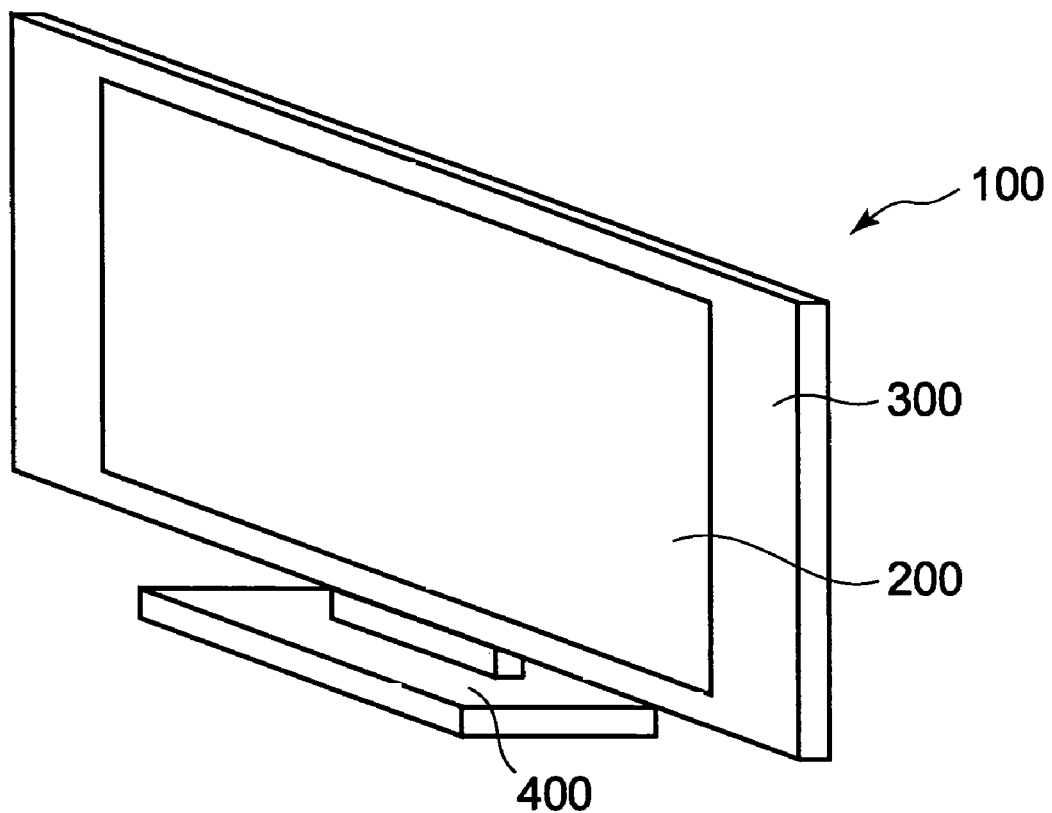
FIG. 24 A schematic perspective view of a liquid crystal television.
Figure 25:
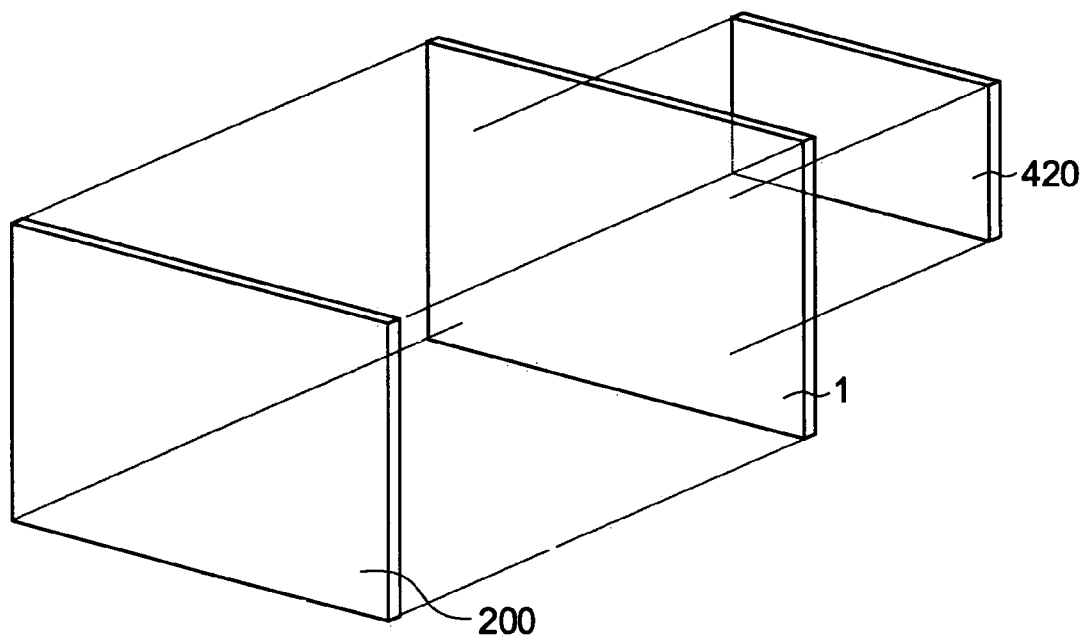
FIG. 25 An exploded perspective view schematically showing a portion held by a casing of the liquid crystal television.

1 illumination apparatus
10 light-emitting diode
11 light beam control device
13 reflective plate
14 light-emitting device substrate
15 substrate
20 phosphor sheet
22 phosphor layer
22a light-emitting surface
23 transparent substrate
31 Fresnel lens
32 lens sheet
33, 34 prism
35, 36 refractive-index distribution optical device
37, 38 subwavelength pillar structure device
41 light guide plate
51 reflective polarizing film
52 lens film
53 diffuser film
54 diffuser plate
100 liquid crystal television
200 liquid crystal panel

The invention claimed is:
1. An illumination apparatus, comprising:
a substrate;
a plurality of light-emitting devices mounted on the substrate;
a phosphor layer to obtain white light based on light from the plurality of light-emitting devices; and
a light beam control portion to control the light from each of the plurality of light-emitting devices so that a view angle dependency of a chromaticity distribution of the phosphor layer is suppressed.

2. The illumination apparatus according to claim 1,
wherein the light beam control portion is an optical device that controls the light from the plurality of light-emitting devices to enter a light-emitting surface of the phosphor layer in a vertical direction or an approximately-vertical direction.

3. The illumination apparatus according to claim 1,
wherein each of the plurality of light-emitting devices is a blue-color light-emitting diode, and
wherein the phosphor layer includes a first phosphor to emit green light when excited by blue light as excitation light and a second phosphor to emit red light when excited by the excitation light.

4. The illumination apparatus according to claim 1,
wherein each of the plurality of light-emitting devices is a blue-color light-emitting diode, and
wherein the phosphor layer includes a phosphor to emit yellow light when excited by blue light as excitation light.

5. The illumination apparatus according to claim 1,
wherein each of the plurality of light-emitting devices is a purple-color or near-ultraviolet light-emitting diode, and
wherein the phosphor layer includes a first phosphor to emit red light when excited by purple or near-ultraviolet light as excitation light, a second phosphor to emit green light when excited by the excitation light, and a third phosphor to emit blue light when excited by the excitation light.

6. The illumination apparatus according to claim 1,
wherein the plurality of light-emitting devices are arranged two-dimensionally on the substrate.

7. The illumination apparatus according to claim 1, further comprising
a light guide plate,
wherein the plurality of light-emitting devices are arranged such that emitted light enters from one end surface of the light guide plate, and
wherein the phosphor layer is disposed to face a light-emitting surface of the light guide plate.

8. The illumination apparatus according to claim 7,
wherein the light beam control portion is interposed between the light-emitting surface of the light guide plate and the phosphor layer.

9. The illumination apparatus according to claim 7,
wherein the light beam control portion is provided in the light guide plate.

10. A display apparatus, comprising:
a display panel; and
an illumination apparatus provided adjacent to the display panel, the illumination apparatus including
a substrate,
a plurality of light-emitting devices mounted on the substrate,
a phosphor layer to obtain white light based on light from the plurality of light-emitting devices, and
a light beam control portion to control the light from each of the plurality of light-emitting devices so that a view angle dependency of a chromaticity distribution of the phosphor layer is suppressed.

11. The display apparatus according to claim 10,
wherein the light beam control portion is an optical device that controls the light from the plurality of light-emitting devices to enter a light-emitting surface of the phosphor layer in a vertical direction or an approximately-vertical direction.

12. The display apparatus according to claim 10,
wherein each of the plurality of light-emitting devices is a blue-color light-emitting diode, and
wherein the phosphor layer includes a first phosphor to emit green light when excited by blue light as excitation light and a second phosphor to emit red light when excited by the excitation light.

13. The display apparatus according to claim 10,
wherein each of the plurality of light-emitting devices is a blue-color light-emitting diode, and
wherein the phosphor layer includes a phosphor to emit yellow light when excited by blue light as excitation light.

14. The display apparatus according to claim 10,
wherein each of the plurality of light-emitting devices is a purple-color or near-ultraviolet light-emitting diode, and
wherein the phosphor layer includes a first phosphor to emit red light when excited by purple or near-ultraviolet light as excitation light, a second phosphor to emit green light when excited by the excitation light, and a third phosphor to emit blue light when excited by the excitation light.

15. The display apparatus according to claim 10,
wherein the plurality of light-emitting devices are arranged two-dimensionally on the substrate.

16. The display apparatus according to claim 10, further comprising
a light guide plate,
wherein the plurality of light-emitting devices are arranged such that emitted light enters from one end surface of the light guide plate, and
wherein the phosphor layer is disposed to face to a light-emitting surface of the light guide plate.

17. The display apparatus according to claim 16,
wherein the light beam control portion is interposed between the light-emitting surface of the light guide plate and the phosphor layer.

18. The display apparatus according to claim 16,
wherein the light beam control portion is provided in the light guide plate.

* * * * *